(12) United States Patent
Moore et al.

(10) Patent No.: US 7,221,263 B2
(45) Date of Patent: May 22, 2007

(54) HELMET LIGHTING SYSTEM

(75) Inventors: David Moore, Larkspur, CA (US); John D. Hebert, San Francisco, CA (US); R. Benjamin Knapp, Sebastopol, CA (US); Richard Greene, San Rafael, CA (US); Derek Loh, San Francisco, CA (US)

(73) Assignee: Zero Nine Design, LLC, Sausalito, CA (US)

( * ) Notice: Subject to any disclaimer, the term of this patent is extended or adjusted under 35 U.S.C. 154(b) by 146 days.

(21) Appl. No.: 10/972,050

(22) Filed: Oct. 22, 2004

(65) Prior Publication Data

US 2005/0134439 A1    Jun. 23, 2005

Related U.S. Application Data

(60) Provisional application No. 60/514,510, filed on Oct. 23, 2003.

(51) Int. Cl.
*B62J 3/00* (2006.01)

(52) U.S. Cl. .............. 340/427; 340/432; 340/467; 340/479

(58) Field of Classification Search ............. 340/427, 340/432, 464, 467, 479
See application file for complete search history.

(56) References Cited

U.S. PATENT DOCUMENTS

| | | | |
|---|---|---|---|
| 4,326,303 A * | 4/1982 | Rappleyea | 2/411 |
| 4,769,629 A * | 9/1988 | Tigwell | 340/467 |
| 4,956,752 A | 9/1990 | Foglietti | |
| 5,040,099 A | 8/1991 | Harris | |
| 5,704,707 A | 1/1998 | Gebelein et al. | |
| D424,247 S | 5/2000 | Deleon | |
| 6,348,859 B1 | 2/2002 | Baker | |
| 6,406,168 B1 | 6/2002 | Whiting | |
| 6,686,837 B2 | 2/2004 | Kim | |
| 6,784,795 B1 * | 8/2004 | Pories et al. | 340/479 |
| 6,933,839 B2 * | 8/2005 | Henry | 340/479 |
| 2002/0039951 A1* | 4/2002 | Hasegawa | 477/183 |
| 2002/0154008 A1* | 10/2002 | Wu et al. | 340/467 |

* cited by examiner

*Primary Examiner*—Brent A. Swarthout
(74) *Attorney, Agent, or Firm*—John P. O'Banion

(57) ABSTRACT

A lighting system adapted to mount on a motorcycle or bicycle helmet. The lighting system includes a one or more accelerometers coupled to the helmet and a processor adapted to process the signals from the accelerometers. The accelerometers may be mounted to the helmet, or the motorcycle or bicycle. The lighting system further includes a light mounted on the helmet that is responsive to the processed signal such that the light illuminates as result of a deceleration force. The system may also include filtering software to remove helmet motion artifact and other noise from the signal. Remote wheel speed indicators may also be used in conjunction with or in place of the accelerometers. Mounting tabs may also be included to releasably attach the lighting unit to the helmet.

36 Claims, 25 Drawing Sheets

HELMET LIGHTING SYSTEM

CROSS-REFERENCE TO RELATED APPLICATIONS

This application claims priority from U.S. provisional application Ser. No. 60/514,510 filed on Oct. 23, 2003, incorporated herein by reference in its entirety.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. § 1.14.

BACKGROUND OF THE INVENTION

1. Field of the Invention

This invention pertains generally to a lighting system for a helmet and more particularly to a helmet lighting system responsive to deceleration forces.

2. Description of Related Art

The use of two-wheeled vehicles, such as motorcycles and bicycles, has become increasingly popular as a mode of transportation.

Unfortunately, the risks associated with riding a motorcycle are generally higher than driving an automobile for several reasons. First, motorcycles are smaller than automobiles and other motorists often have a hard time seeing motorcycles on the roads. Further, motorcycles are generally capable of higher rates of acceleration than automobiles causing other motorists to often lose track of the position of a nearby motorcycle. Also, motorcycles are generally capable of higher rates of de-acceleration than automobiles causing motorcycles to often be hit from behind by motorists that are unable to stop in time. Finally, motorcycles lack the weight, protective structure and other assorted safety devices such as airbags that are offered by automobiles.

In response to the dangers of riding such vehicles, government legislation has made it mandatory that certain safety precautions be taken when riding. A typical example of this is the helmet law, which requires all riders of motorcycles to wear a helmet at all times while riding. It is also quite common to see adults and children who ride bicycles to be wearing helmets, as well as other protective devices and clothing.

While these safety precautions do provide some added safety, one of the most serious risks to two-wheeled vehicles is the fact that, as a result of the smaller size of the vehicle and minimized space for lighting systems, they are often very difficult to see.

In the mid 80's, the U.S. government researched automotive tail light positioning and found that significantly fewer accidents occur in vehicles having a brake light positioned at or near the highest point on the rear of the vehicle. In 1986, the U.S. government mandated that automobiles sold in the U.S. be equipped with a third brake light positioned near the highest point on the rear of the vehicle. To date, a similar law has not been passed for motorcycles.

Motorcycles have as standard equipment lights that function in the same manner as those on four-wheeled vehicles. There are head and tail lights, turning indicators and brake lights. However, the standard motorcycle brake light warning systems that are standard on motorcycles are inadequate when compared to the current systems used by other motor vehicles.

Because motorcycles have single light taillights, they are difficult for many motorists to judge safe distance. Humans have two eyes to judge distance, called "stereoscopic" vision. Thus, the single taillight not only has a smaller illuminated area, but also detracts from the rider's ability to gauge distance. This makes judging stopping distance more difficult for motorists even with good eyesight.

In addition, motorcyclists generally apply brakes less often the other motor vehicles when decelerating. Because to the high horsepower to weight ratio of motorcycles, many motorcyclists decelerate without the use of brakes, often only applying the breaks at slow speeds to come to a full stop. Thus, the motorcyclist may be decelerating without any warning to other motorists via the break light, resulting in decreased stopping distances when compared to similar situations with other moving vehicles.

It would be extremely beneficial for motorcycles and other two-wheeled vehicles to have an additional light or lights. Ideally, the light(s) would function much better if they were mounted or attached at a location that is in the direct line of sight of other drivers, such as at the head level of the two-wheeled vehicle rider.

Accordingly, there have been designs for locating a motorcycle brake light on the helmet of the rider, see U.S. Pat. Nos. 6,686,837, 5,704,707, 5,040,099, and 4,956,752. However, these systems either require tapping into the existing break light wiring, or installing a sensor at the brake lever itself. In addition to being costly and cumbersome to install, these systems also do not provide warning for non-brake induced deceleration.

Other systems have included switch type sensors located on the helmet of the user to effect power to the light based on acceleration or deceleration forces, see U.S. Pat. Nos. 6,348,859 and 4,769,629. However these systems have no ability to distinguish deceleration forces from helmet movement caused by the user. Thus, these systems are ineffective as they result in excessive false positive readings.

For these reasons, it would be desirable to provide an improved helmet lighting system that is responsive to deceleration forces.

It would further be desirable to provide a helmet lighting system with improved illumination characteristics to increase the visibility of motorcyclists to other motorists.

At least some of these objectives will be met with the invention described herein.

BRIEF SUMMARY OF THE INVENTION

An aspect of the invention is a lighting system adapted to mount on a helmet of a person riding a motorcycle or bicycle. The lighting system includes a first accelerometer coupled to the helmet, and a processor coupled to the first accelerometer, wherein the processor is adapted to process a signal from the first accelerometer. The lighting system further includes a light connected to the processor, wherein the light is mounted on the helmet and is responsive to the processed signal such that the light illuminates as result of a deceleration force.

In many embodiments, the lighting system has a power source coupled to the processor and light. The lighting system may also have a power switch coupled to the power source for turning the system on and off.

In a preferred mode of the invention, the processor comprises a filter for filtering the signal from the first accelerometer. The filter may include a low-pass filter to remove artifact such as helmet motion. In another embodiment, the filter comprises a high-pass filter. The high-pass filter may be configured to filter out data other than road noise. In such a configuration, the processor may be adapted to evaluate the processed road noise signal from the high-pass filter to determine if the rider is at rest. Generally, the light is responsive to the processed signal such that the light turns on when the rider is at rest.

In a preferred mode of the invention, the light comprises a first and second LED arrays. The light may also have a pair of refracting lenses covering the first and second LED arrays. Such lenses may be positioned to generate light beams at a 45 degree angle. Preferably, the second LED array is spaced apart from the first LED array.

In another mode of the invention, the lighting system further comprises a second accelerometer, wherein the second accelerometer is positioned substantially perpendicular to the first accelerometer. In one embodiment of the present mode, the first accelerometer is positioned substantially horizontally and the second accelerometer is positioned substantially vertically. The first and second accelerometers may preferably comprise dual-axis accelerometers that both measure accelerations in two orthogonal axes.

In an alternative mode of the invention, the lighting system further includes a wheel speed sensor adapted to be mounted to the fork of the bicycle or motorcycle, wherein the wheel speed sensor is adapted to emit a signal having wheel speed data. The lighting system further includes a receiver coupled to the processor, such that the receiver is configured to receive the emitted wheel speed sensor signal for processing by the processor. In this mode, the processor is adapted to process the accelerometer signal and the wheel sped signal to determine the velocity and acceleration of the rider.

In another mode of the invention, the lighting system comprises a base configured to house the processor, accelerometer and light, and a mounting tab attached to the helmet and configured to releasably attach the base to the helmet. The lighting system may be self contained in the attachable base, wherein the base is configured to contour the external shape of the helmet.

In another mode of the invention, the accelerometer is mounted to a location on the motorcycle. In this mode, a RF transmitter is connected to the accelerometer so that the transmitter sends an RF signal having data acquired by the accelerometer. The lighting system further includes an RF receiver connected to the processor on the helmet, wherein the RF receiver is configured to receive the emitted accelerometer signal for processing by the processor.

In another aspect of the invention, a method is disclosed for generating a brake light signal on a helmet adapted to be worn by a person operating a motor vehicle. The method comprises the steps of acquiring accelerometer data from one or more accelerometers positioned on the helmet, filtering the accelerometer data, comparing said filtered accelerometer data to a threshold value, and sending a signal to turn said brake light on or off in response to the filtered accelerometer data crossing said threshold value, wherein the brake light is positioned at a rearward section of the helmet.

In a preferred mode of the present aspect, filtering the accelerometer data comprises applying a low-pass filter to remove head and vibration induced artifact, wherein the filtered signal corresponds to deceleration and acceleration of the motorcycle or bicycle. The filtered signal may also be down-sampled prior to comparison to the threshold value. The accelerometers are preferably calibrated prior to filtering the accelerometer data.

In a preferred embodiment, the accelerometer data may be acquired from a plurality of accelerometers. For example, data may be acquired from one or more accelerometers positioned horizontally on the helmet and one or more accelerometers positioned vertically on the helmet. In such a configuration, the brake light is turned on in response to the filtered accelerometer data having a value of less than zero for all the accelerometers, and a value of less than 0.1 g for the sum of all accelerometer values. Accordingly, the brake light is turned off in response to the filtered accelerometer data having a value of less equal to or greater than zero for all the accelerometers, and a value of more than 0.1 g for the sum of all accelerometer values.

In another mode of the invention, filtering the accelerometer data further comprises applying a high-pass filter to the acquired accelerometer data, wherein the high-pass filtered signal corresponds to road noise imparted on the accelerometer. For example, the brake light may be turned on in response to a road noise value less than 1.2 times a calibrated road noise value.

In another mode of the invention, wheel velocity data may be acquired from a wheel speed indicator mounted on the motorcycle or bicycle, wherein the wheel velocity data is compared with the filtered accelerometer data.

In one embodiment, acquiring wheel velocity data from a wheel speed indicator comprises sensing the wheel speed of the bicycle or motorcycle, transmitting the wheel speed from a location on the bicycle or motorcycle, and receiving the wheel speed signal at a location on the helmet.

In another aspect of the invention, an apparatus is disclosed for illuminating a portion of a helmet of a person riding a motorcycle. The apparatus generally comprises a means for measuring acceleration that is coupled to the helmet, a means for processing a signal from said acceleration measuring means, and an illumination means positioned on a rearward portion of said helmet. The illumination means is responsive to the signal from the processing means such that the illumination means illuminates as result of a deceleration force on the helmet.

In a preferred mode of the present aspect, the processing means comprises a filtering means. The filtering means may include a low-pass filter to remove helmet motion artifact from the acceleration signal.

In another preferred mode, the illumination means comprises a pair of horizontally spaced-apart LED arrays.

Generally, the means for measuring acceleration comprises one or more dual-axis accelerometers. In one embodiment, the means for measuring acceleration is positioned on the helmet. Alternatively, the means for measuring acceleration may be positioned on the motorcycle. In such an embodiment, the system further includes an RF transmission means for sending the acceleration signal to the processing means.

The system may further include an attachment means for releasably attaching the apparatus to the helmet.

Another aspect of the invention comprises a helmet lighting system for use on a vehicle. The lighting system includes an accelerometer attached to the vehicle, a transmitter for transmitting a signal from said accelerometer, a receiver positioned on the helmet, the receiver adapted to detect the signal from the transmitter, and a light connected to the receiver, wherein the light is responsive to the receiver signal such that the light illuminates as result a deceleration force on the vehicle. The transmitter and receiver preferably communicate via an RF signal.

In another aspect of the invention, a lighting system adapted to mount on a helmet of a person riding a motorcycle is disclosed. The lighting system has a rotational sensor adapted to be mounted on a fork and wheel of a bicycle or motorized bicycle, wherein the rotational sensor is configured to acquire wheel speed data The lighting system according to the present aspect further includes a transmitter connected to the rotational sensor, the transmitter configured to send a signal having data acquired by the rotational sensor, a receiver connected to a processor on the helmet, the receiver configured to receive the wheel speed signal for processing by the processor, and a first light connected to the processor, wherein the first light is responsive to the processed signal such that the light illuminates as result of a deceleration of the bicycle or motorcycle.

In an alternative mode of the present aspect, the system may further include one or more accelerometers mounted to the helmet and configured to generate a signal for processing by the processor, wherein the processor is configured to compare the accelerometer signal with the wheel speed signal.

In another mode of the present aspect, the system further includes a console mounted on the motorcycle or bicycle, wherein the console comprises a switch to power the system on and off. In one embodiment, a second light is connected to the processor, the second light having a different color than the first light, and the console further comprises a perimeter sensor, the perimeter sensor detecting when the person is inside a sensing a sensing area such that the second light illuminates in response to the person being outside the sensing area.

In another mode of embodiment of the invention, the console is configured to display the velocity of the bicycle.

In one aspect of the invention, lighting system adapted to mount on a helmet of a person riding a motorcycle or bicycle comprises a base, a light housed within the base, the light configured to illuminate as result of a deceleration of the motorcycle or bicycle, and a mounting tab adapted to be fixedly mounted on the helmet. The mounting tab is configured to mate with the base such that the base may be releasably attached to the helmet.

In yet another aspect, a helmet lighting system is disclosed for use on a vehicle. The lighting system comprises first and second accelerometers attached to the helmet, wherein the second accelerometer is positioned substantially perpendicular to the first accelerometer, and a light positioned on the helmet, the light responsive to signals from the first and second accelerometers. In the current aspect, the orientation of the first and second accelerometers aides in distinguishing helmet induced acceleration readings from actual vehicle acceleration readings.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

Figure 7B:
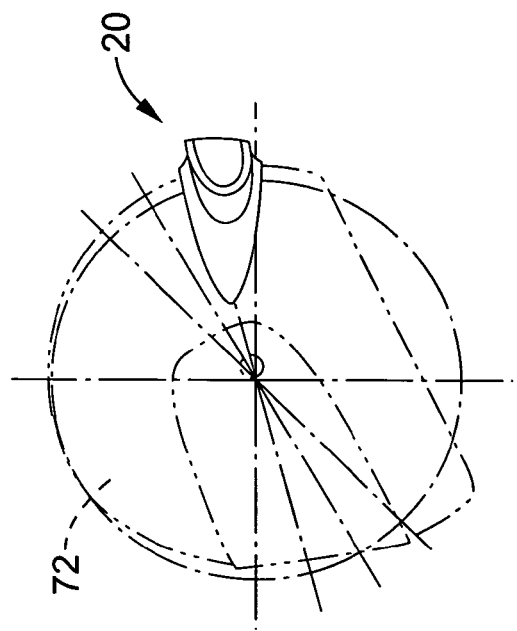
Figure 7C:
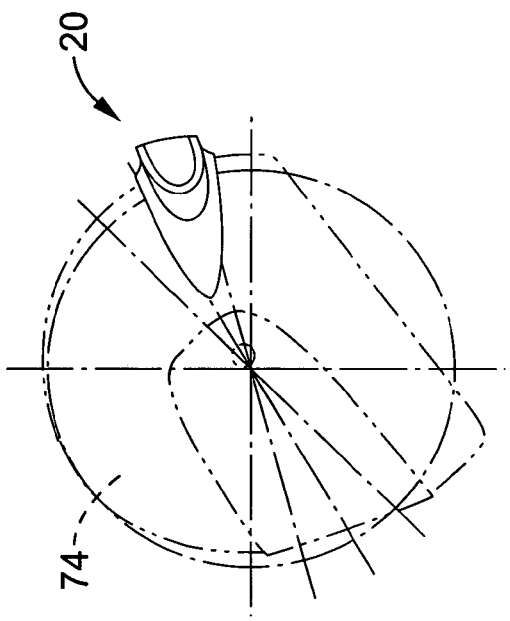
Figure 7A:
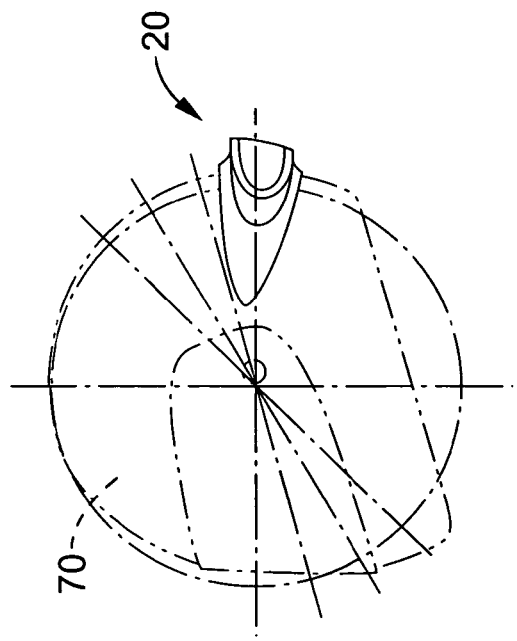

FIGS. 7A–C illustrate the lighting unit installed at different mounting configurations.

Figure 8B:
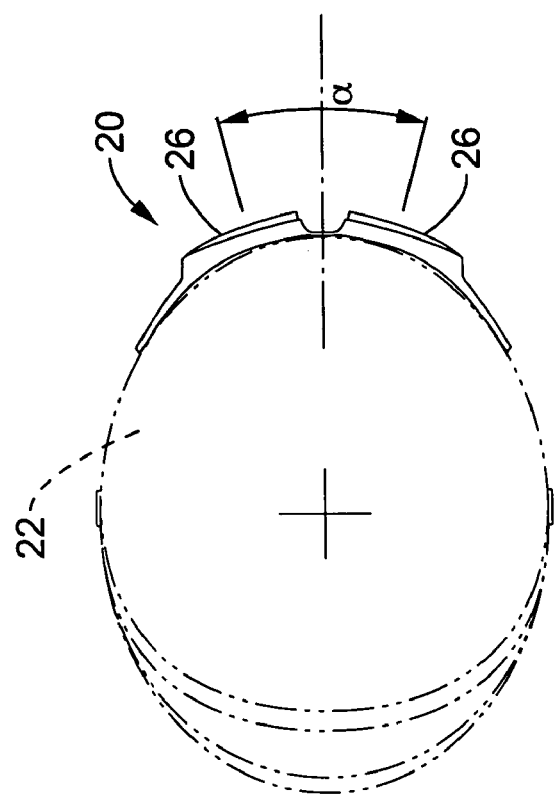
Figure 8A:
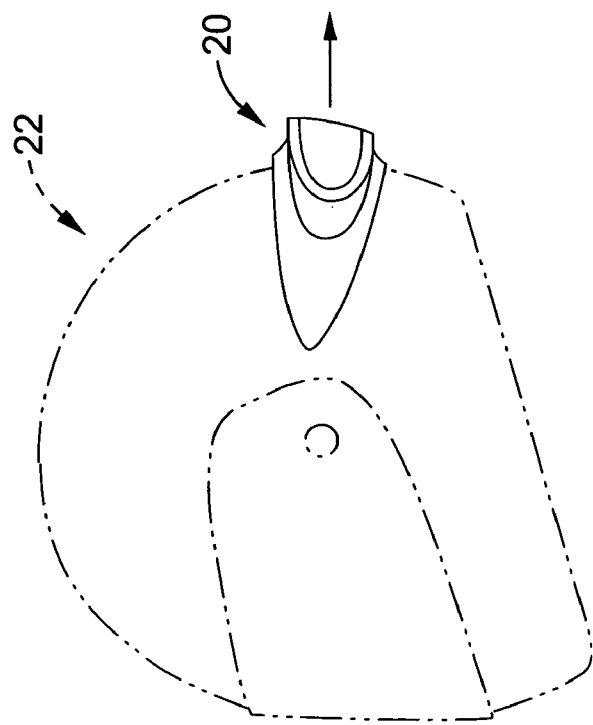

FIG. 8A illustrates a side view of the lighting unit mounted to a helmet.

FIG. 8B illustrates a top view of the lighting unit of FIG. 8A.

Figure 9B:
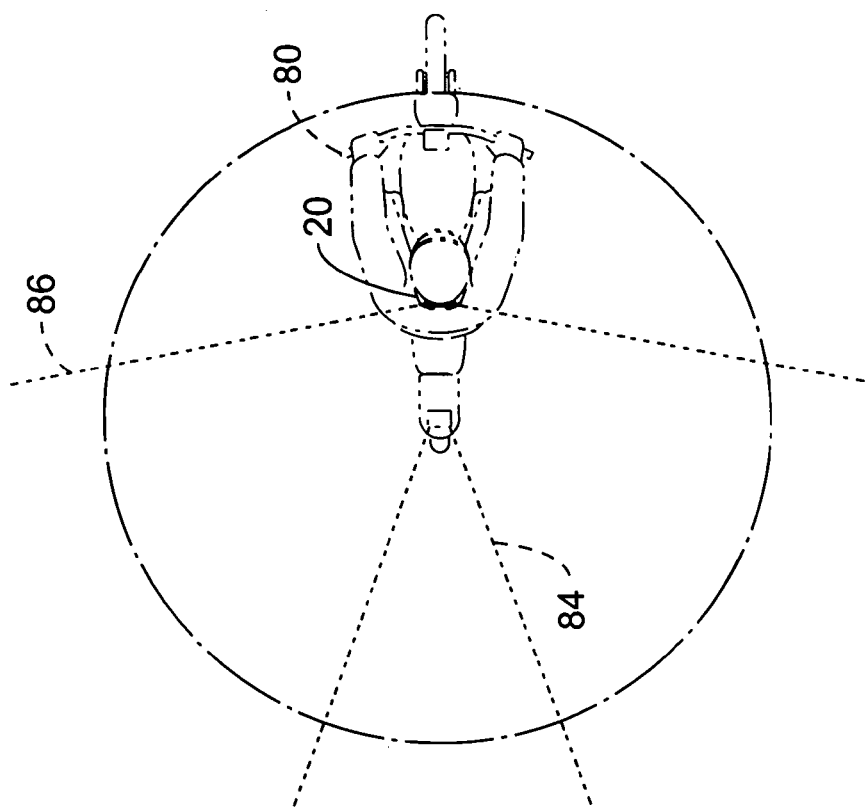
Figure 9A:
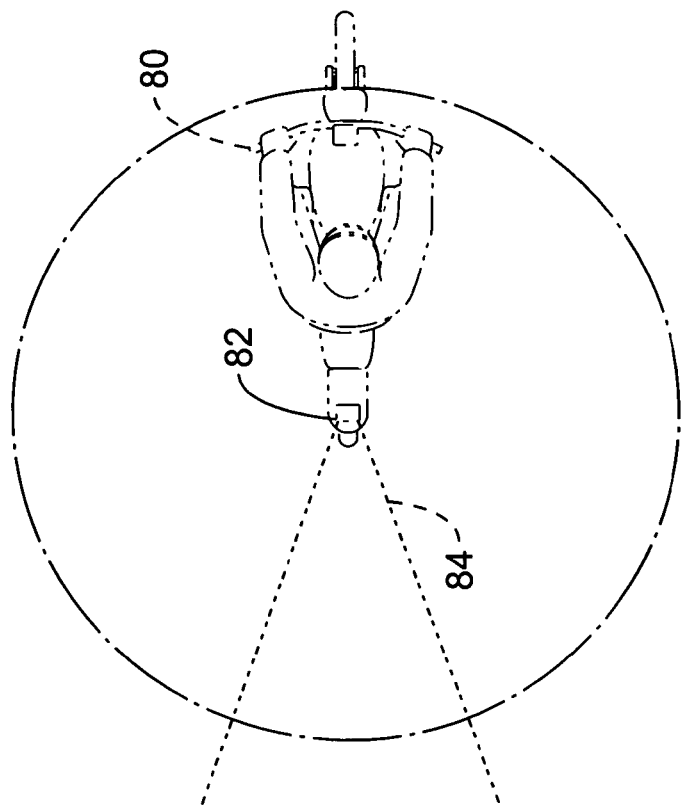

FIG. 9A illustrates the brake light beam spread of a current art motorcycle taillight.

FIG. 9B illustrates the beam spread of the current invention in relation to the beam spread of the motorcycle taillight.

Figure 10:
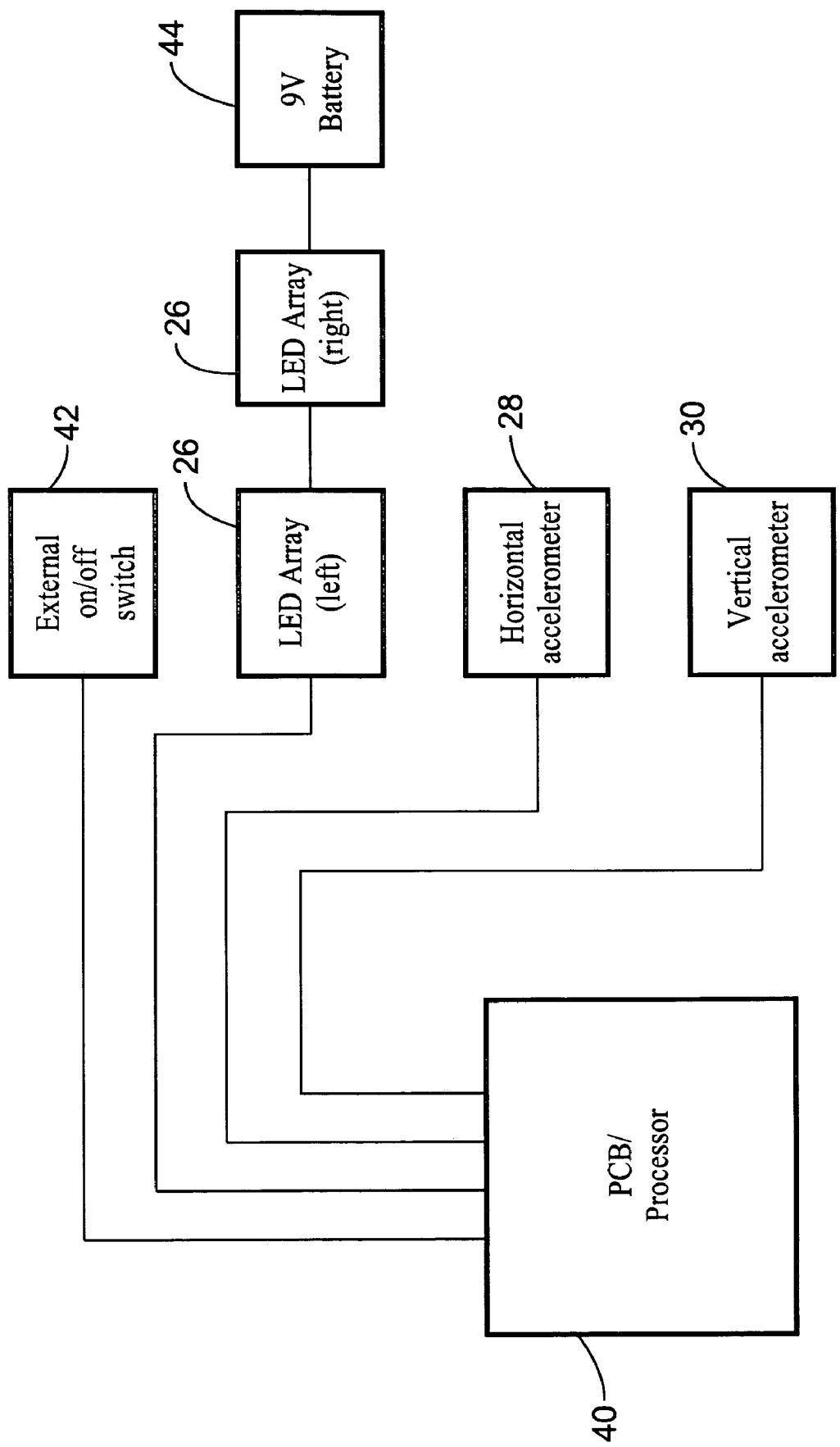

FIG. 10 is a schematic diagram of the electrical wiring configuration of the helmet lighting system.

Figure 11:
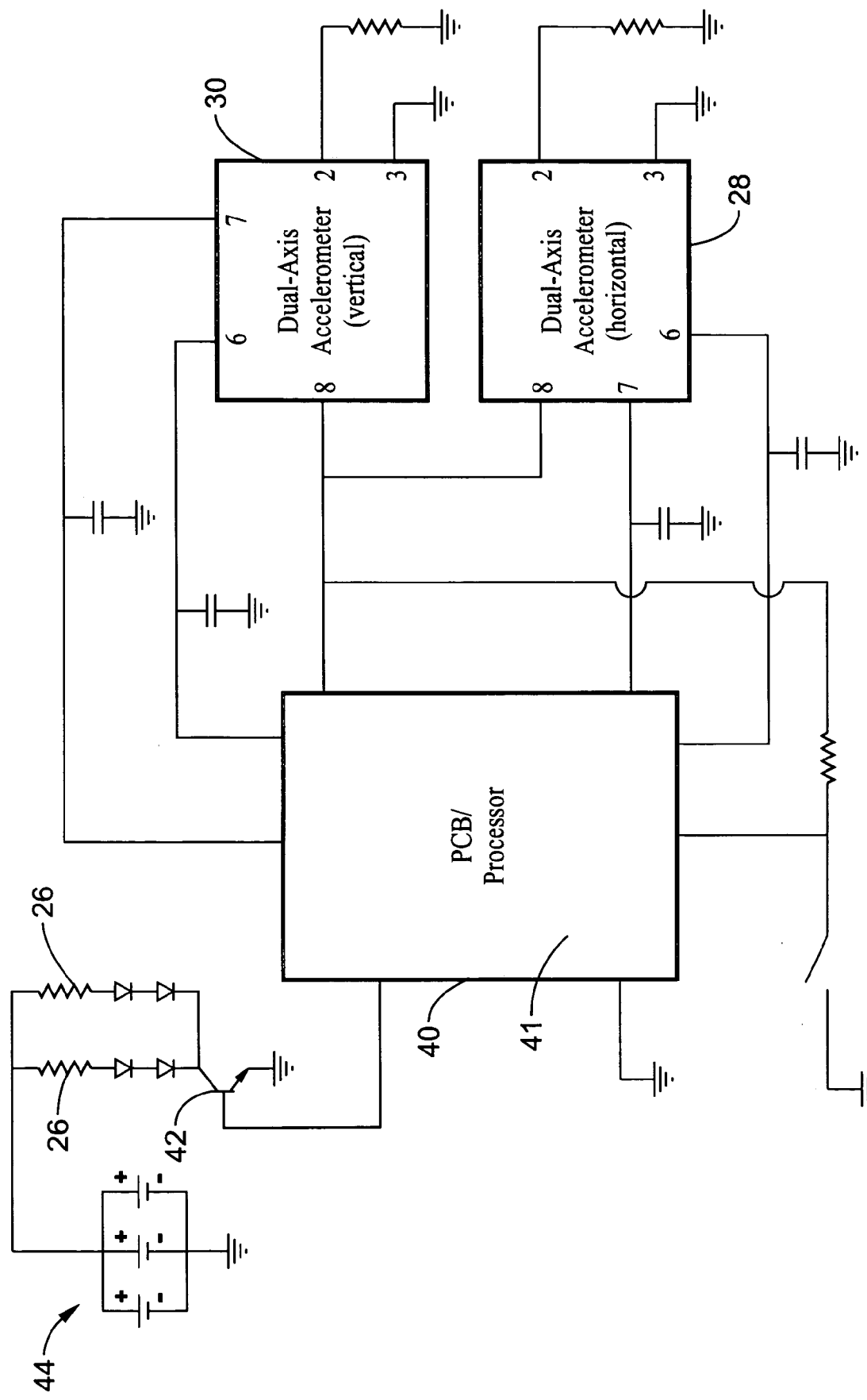

FIG. 11 is another view of the electrical wiring configuration of the helmet lighting system.

Figure 12:
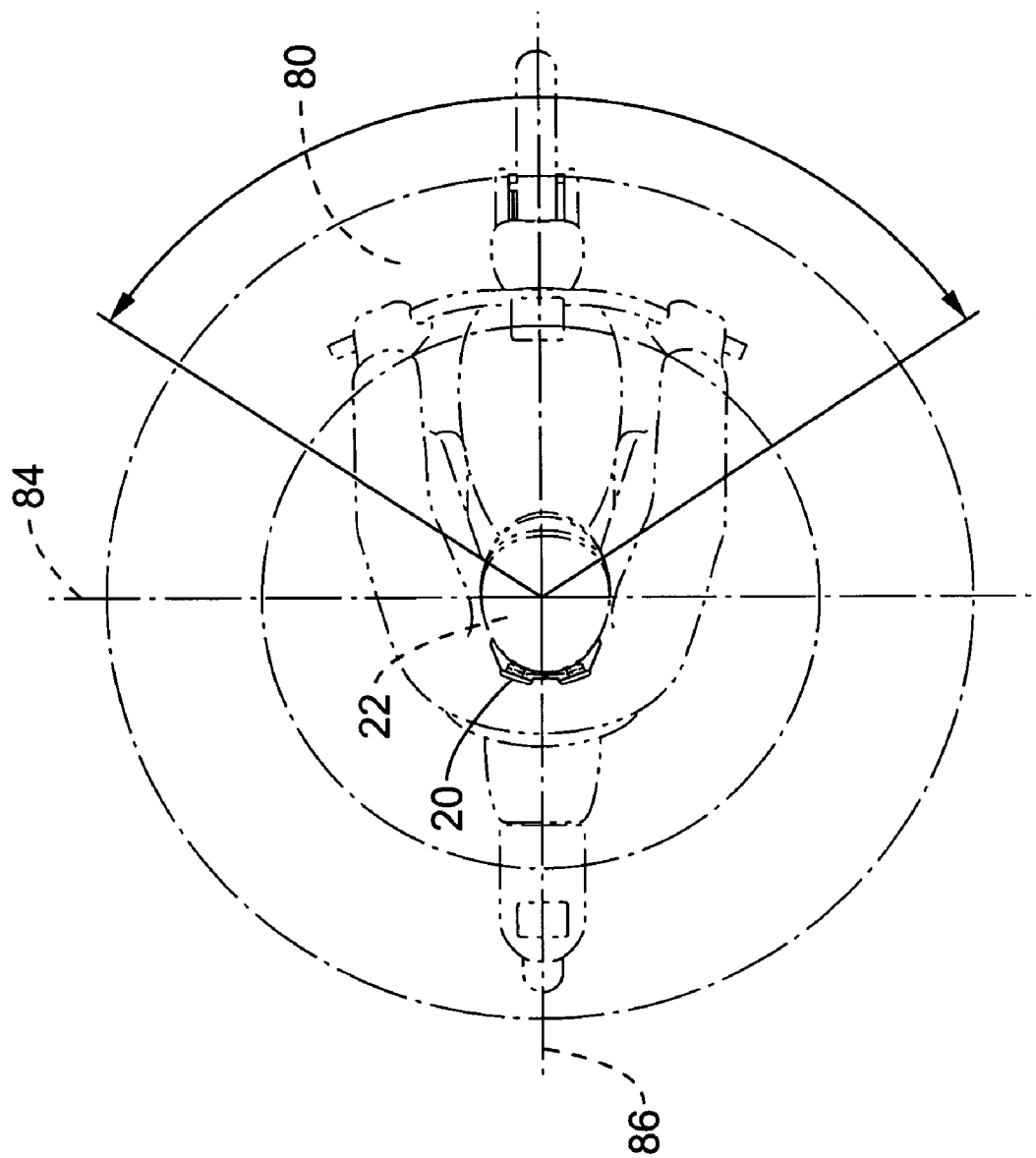

FIG. 12 is a top view of a motorcycle rider illustrating the helmet motion axes.

Figure 13:
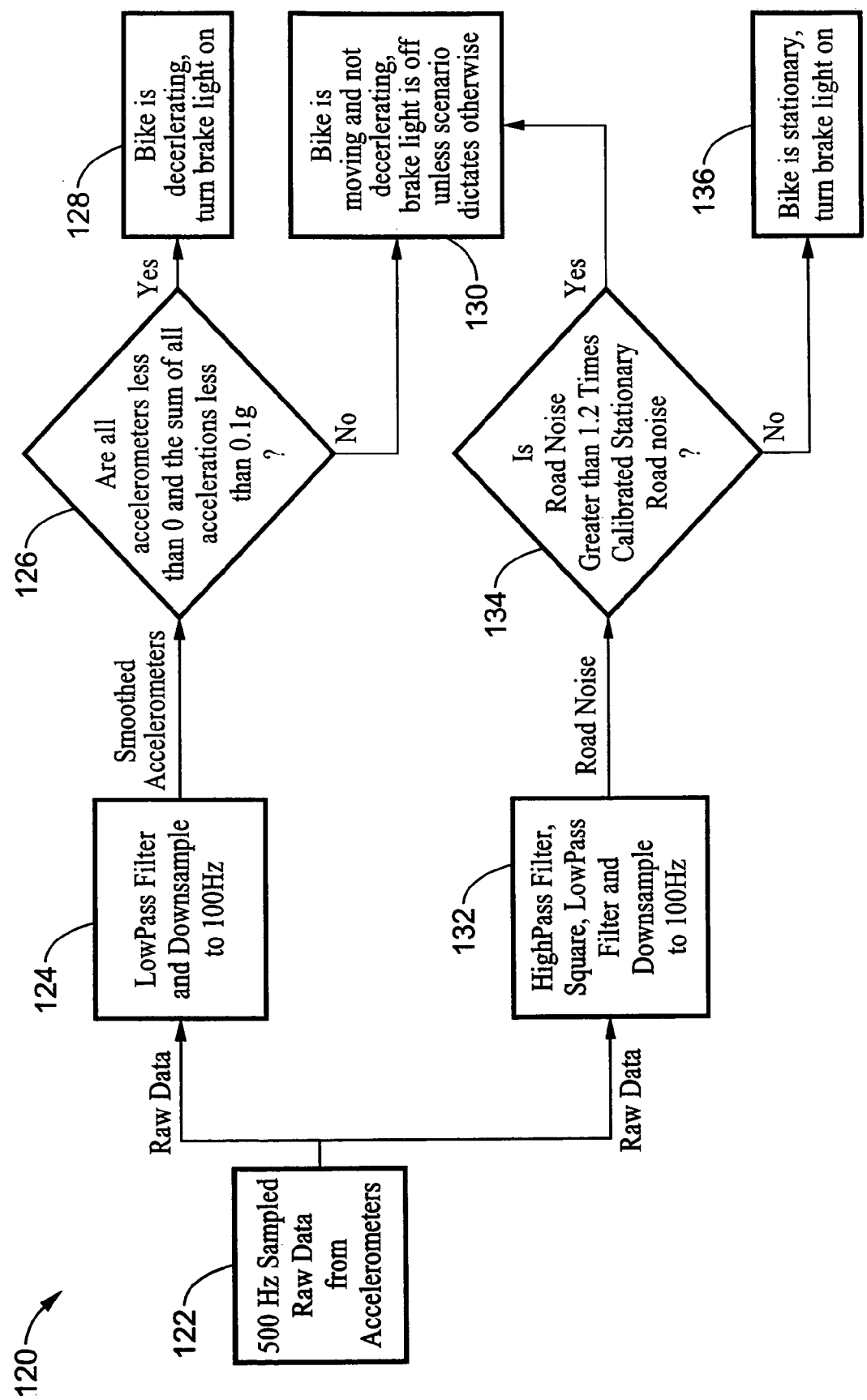

FIG. 13 is a schematic diagram of the software architecture of the present invention.

Figure 14:
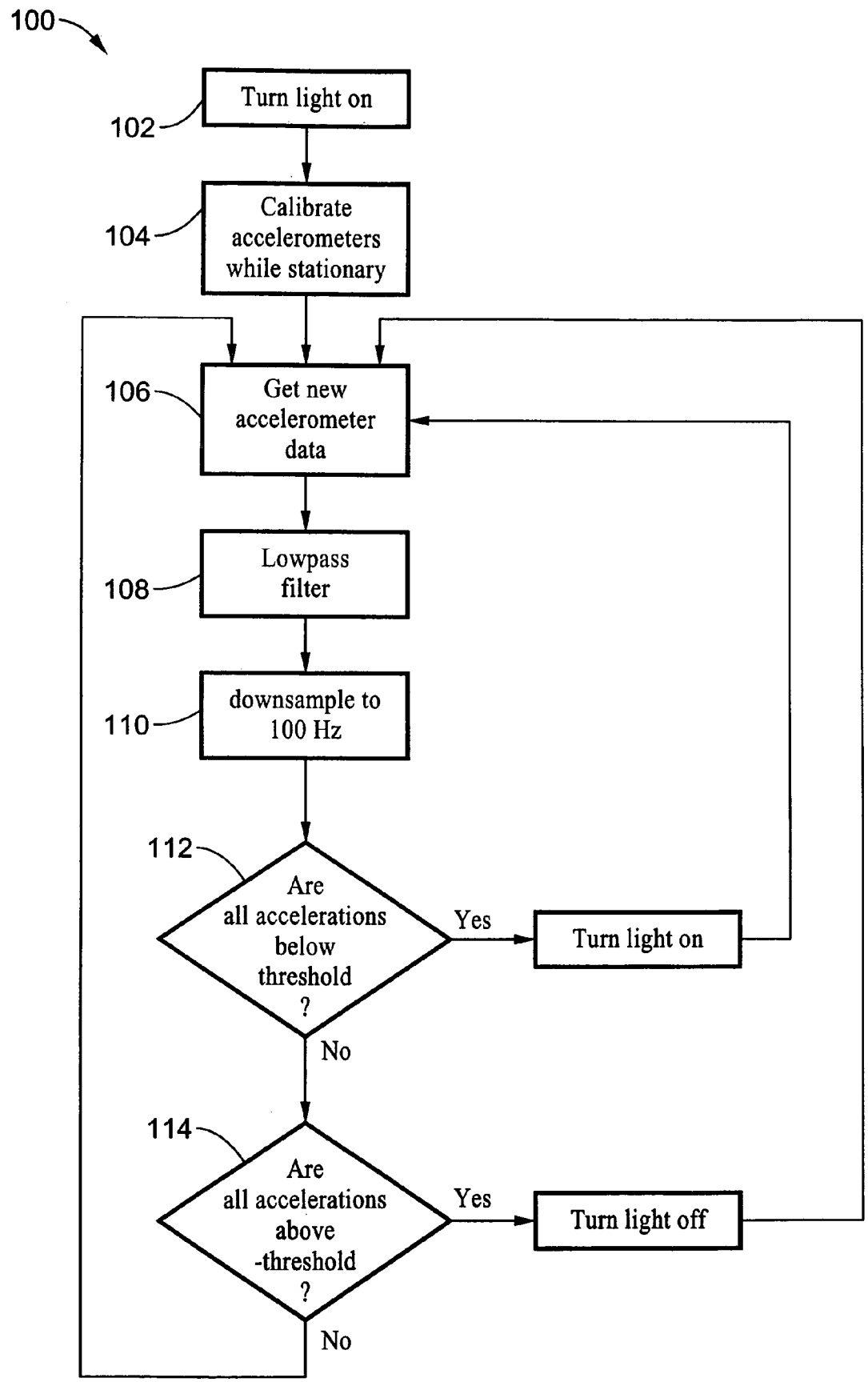

FIG. 14 is another schematic diagram of the software architecture of the present invention.

Figure 15A:
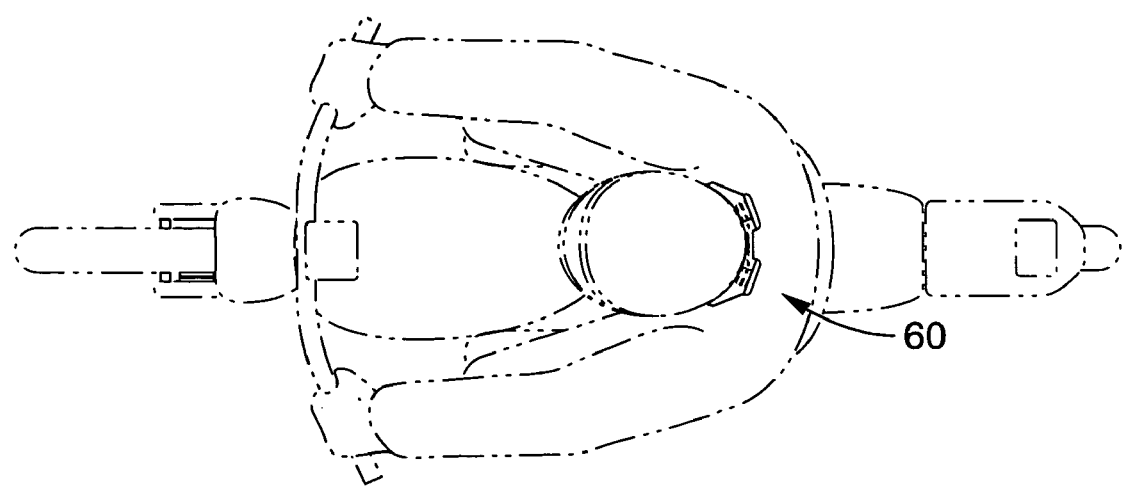
Figure 15A:
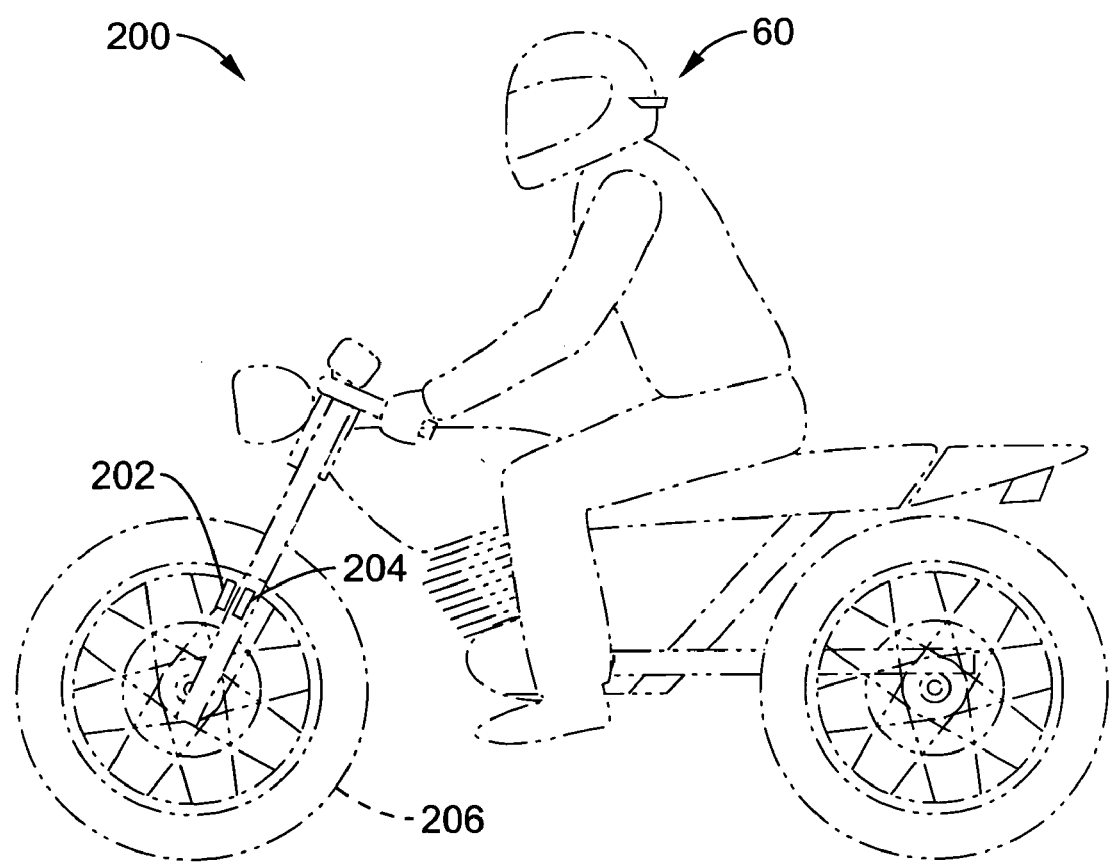
Figure 15B:
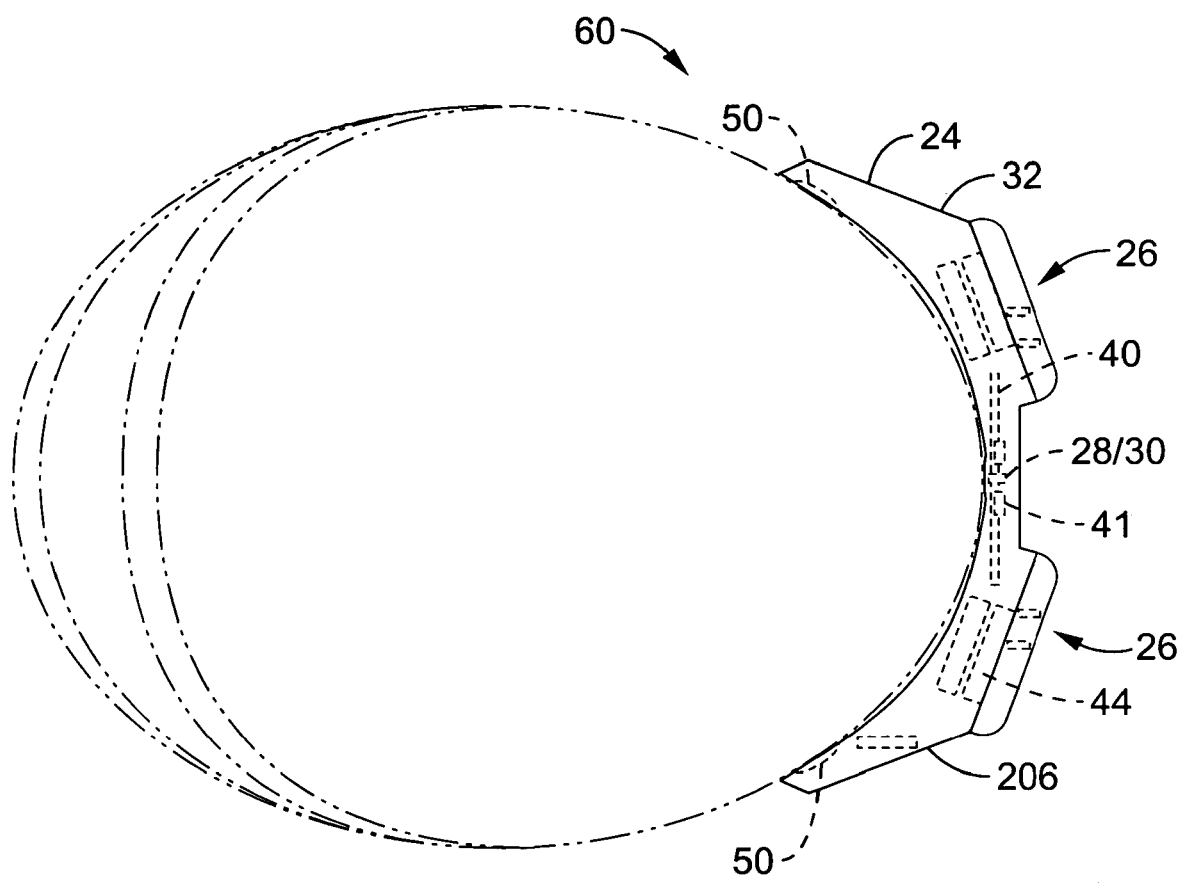

FIGS. 15A–B illustrate an embodiment of the present invention with a wheel speed indicator.

Figure 16A:
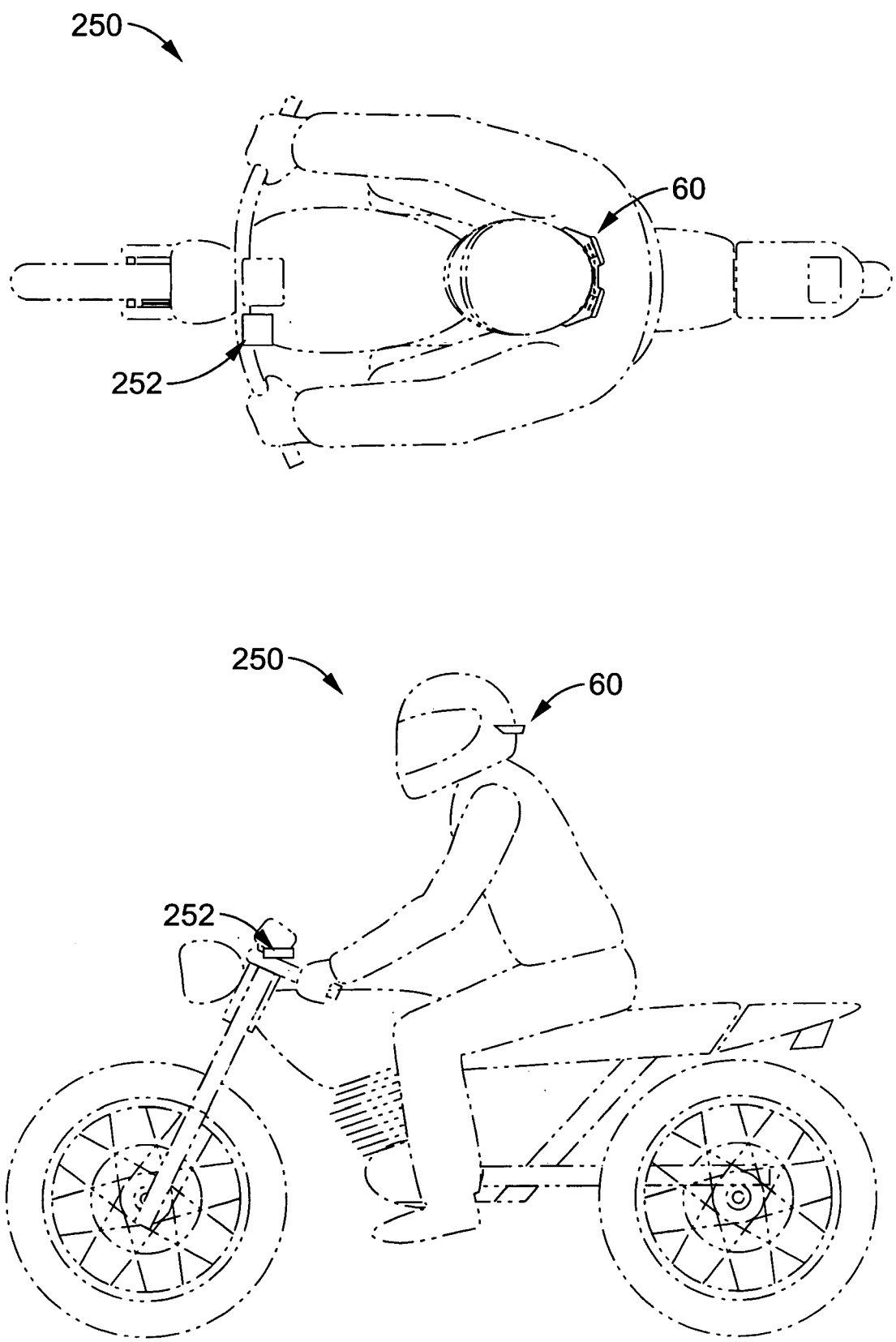
Figure 16B:
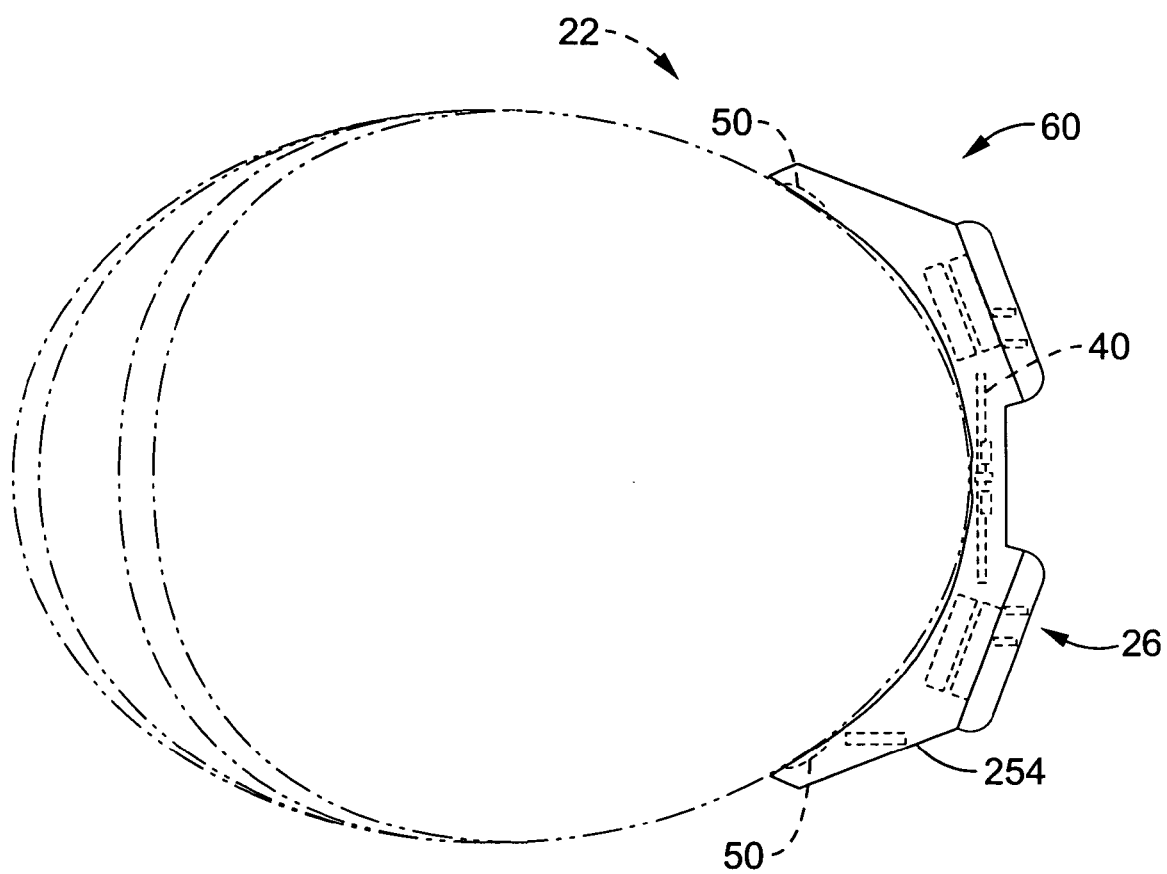

FIGS. 16A–B illustrate an embodiment of the present invention with an accelerometer mounted on the motorcycle.

Figure 17A:
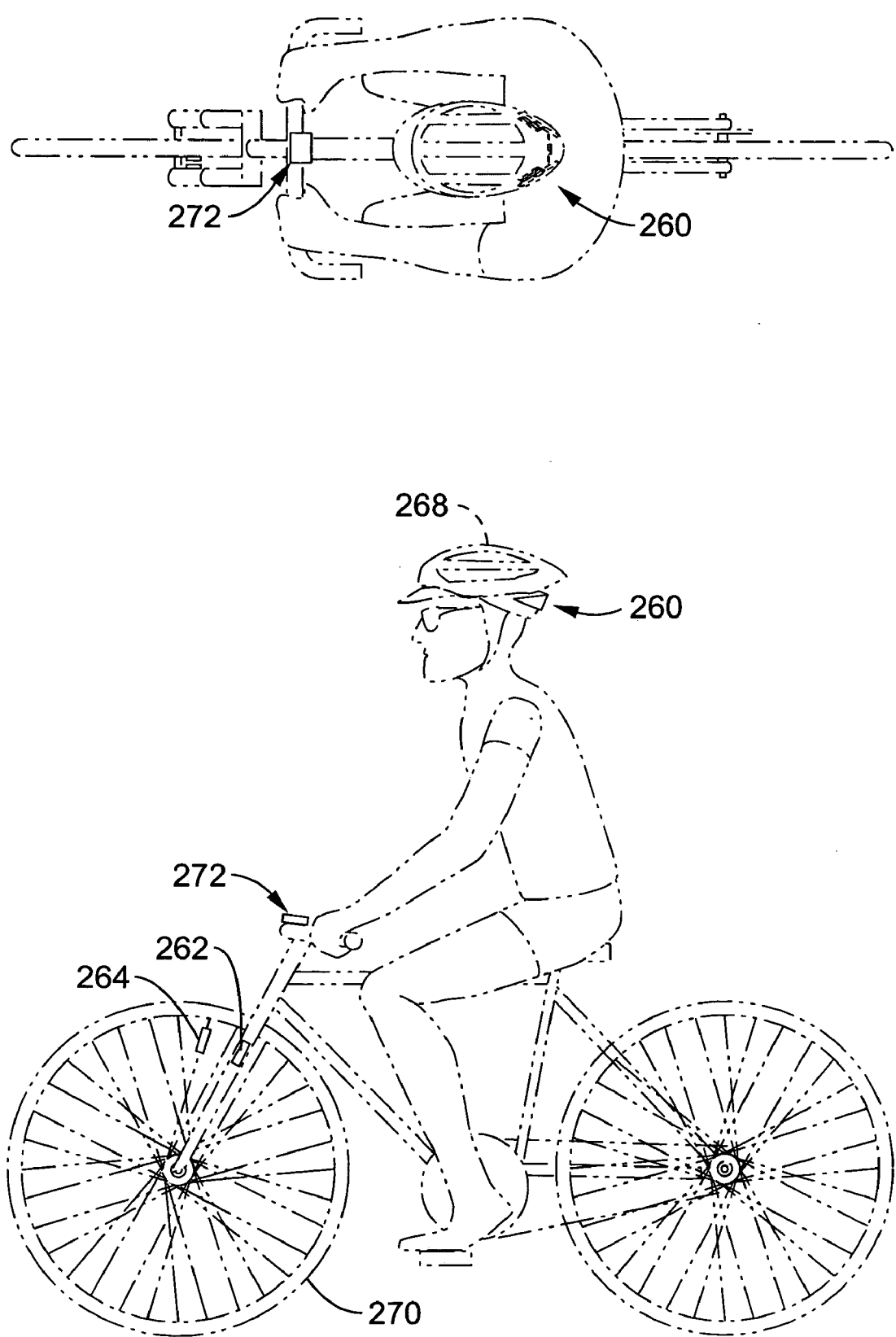
Figure 17B:
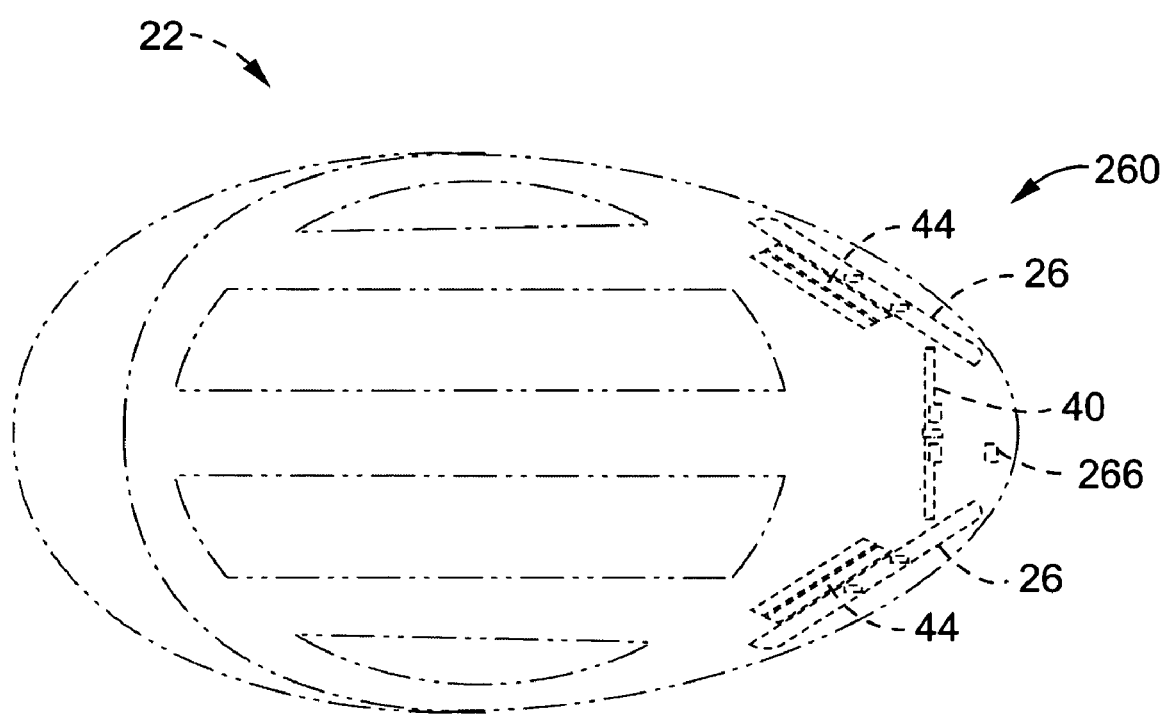

FIGS. 17A–B illustrate an embodiment of the present invention having a wheel speed indicator mounted to a bicycle.

Figure 18A:
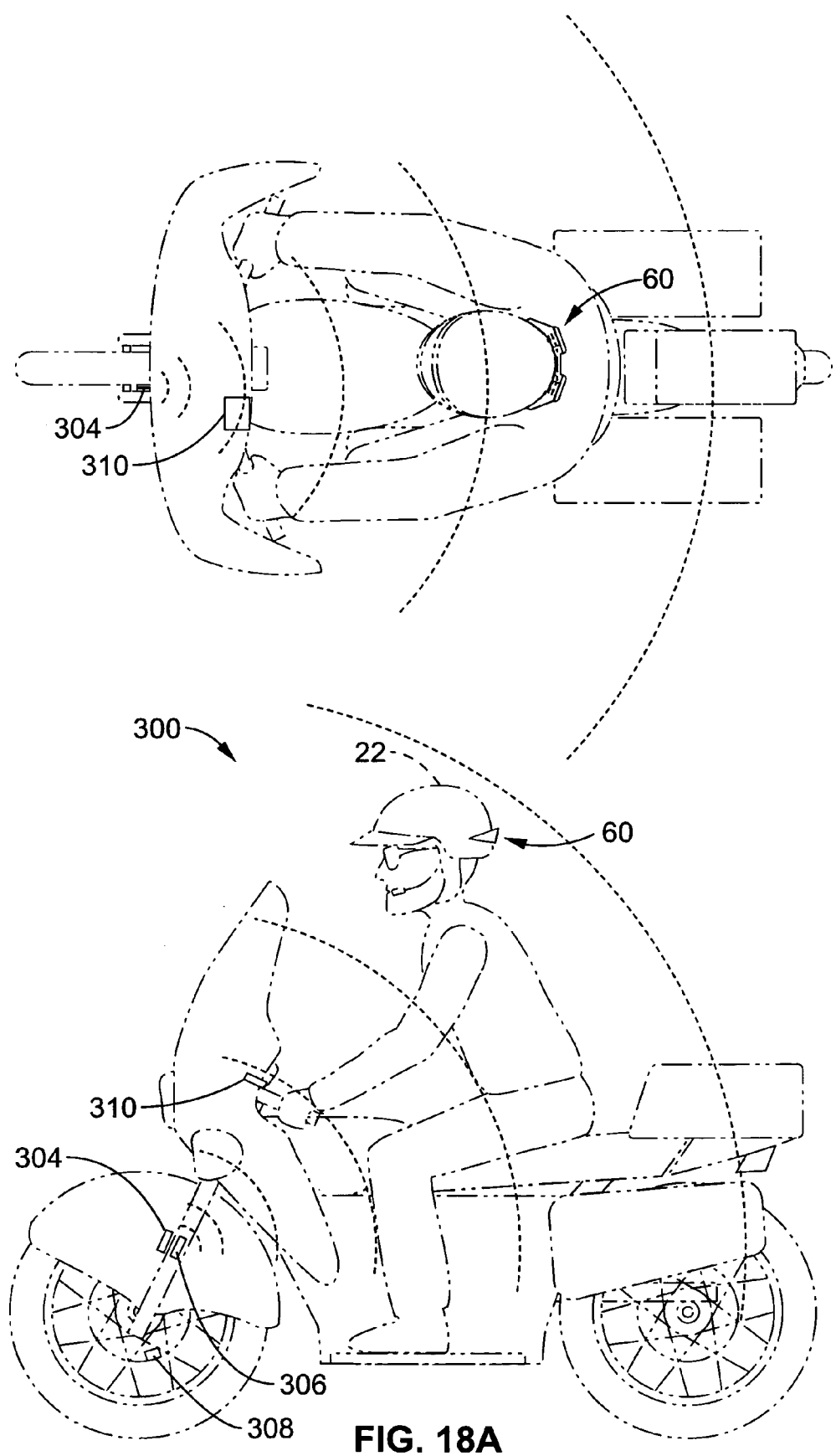
Figure 18B:
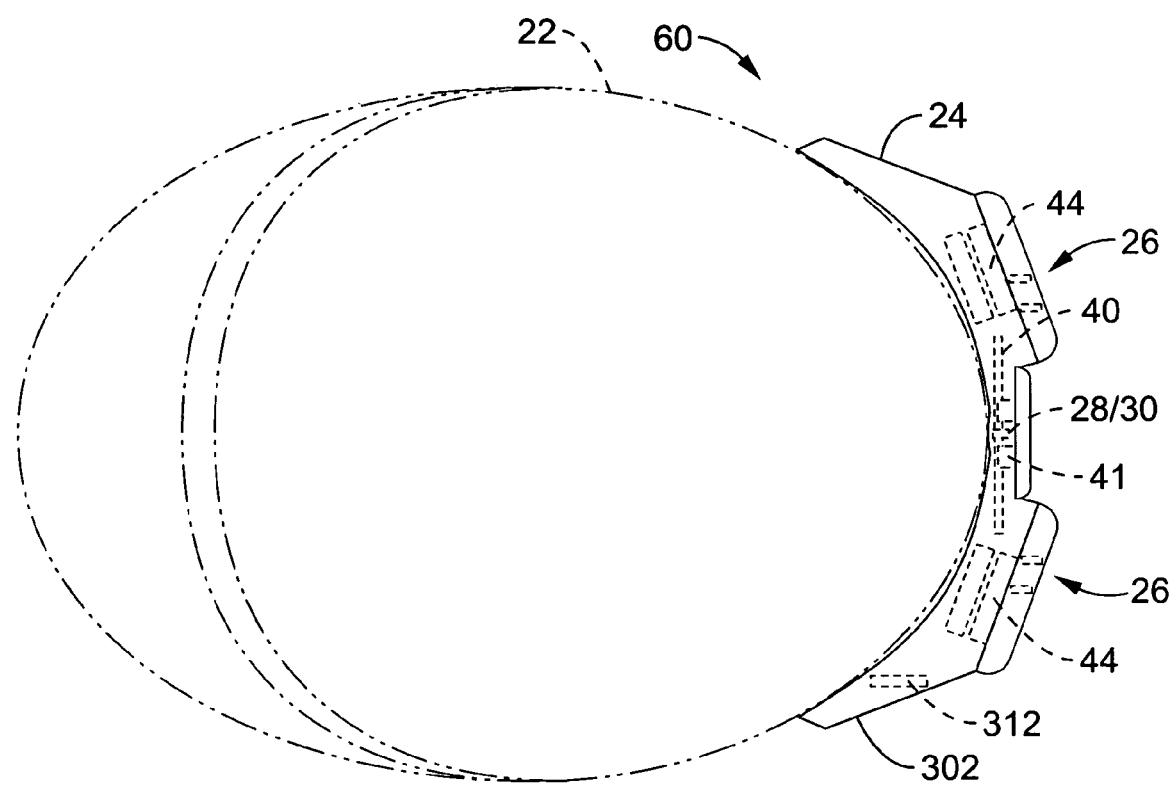

FIGS. 18A–B illustrate an embodiment of the present invention having a wheel speed indicator mounted to a law-enforcement motorcycle and a perimeter sensor.

Figure 19A:
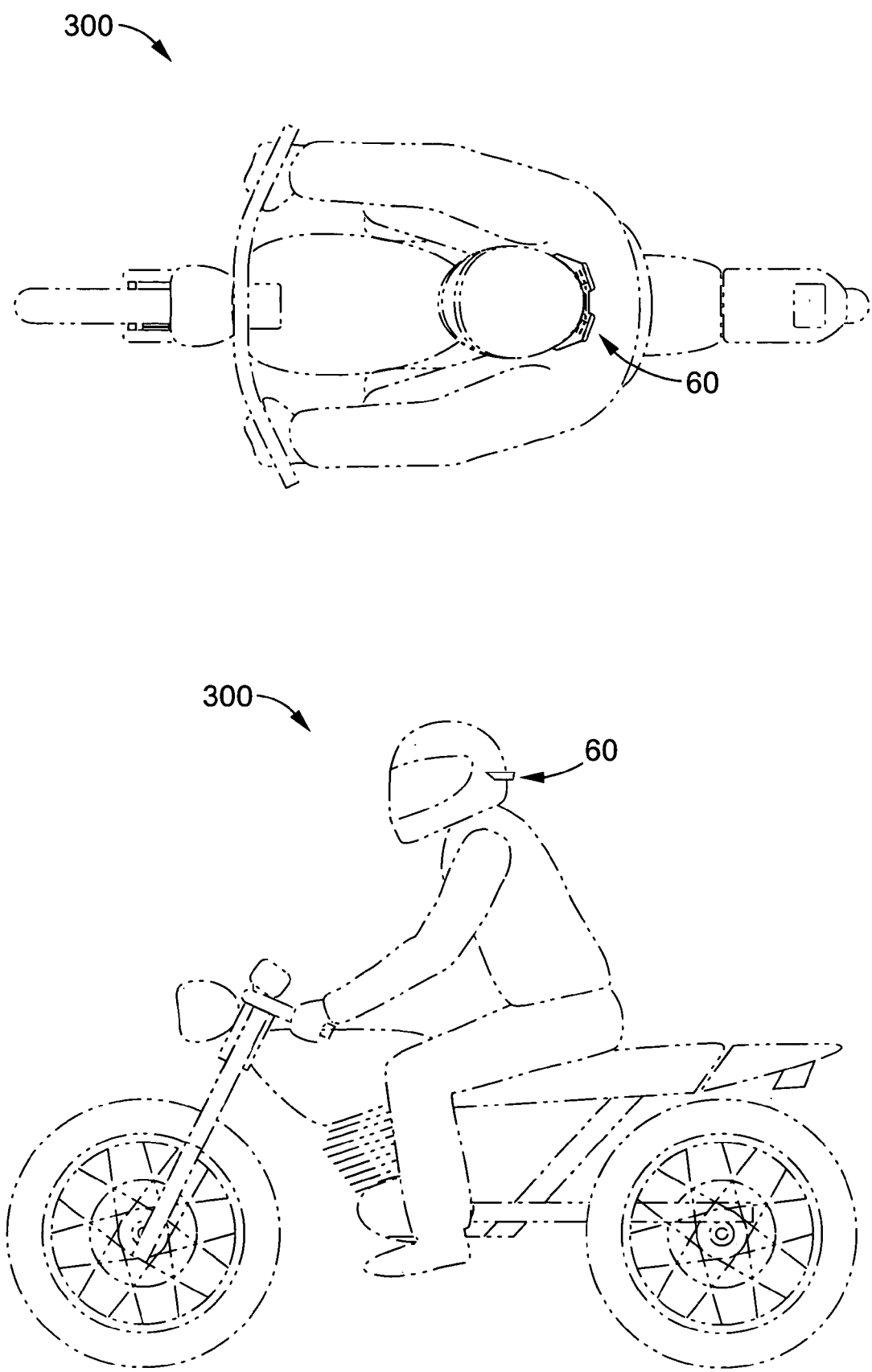
Figure 19B:
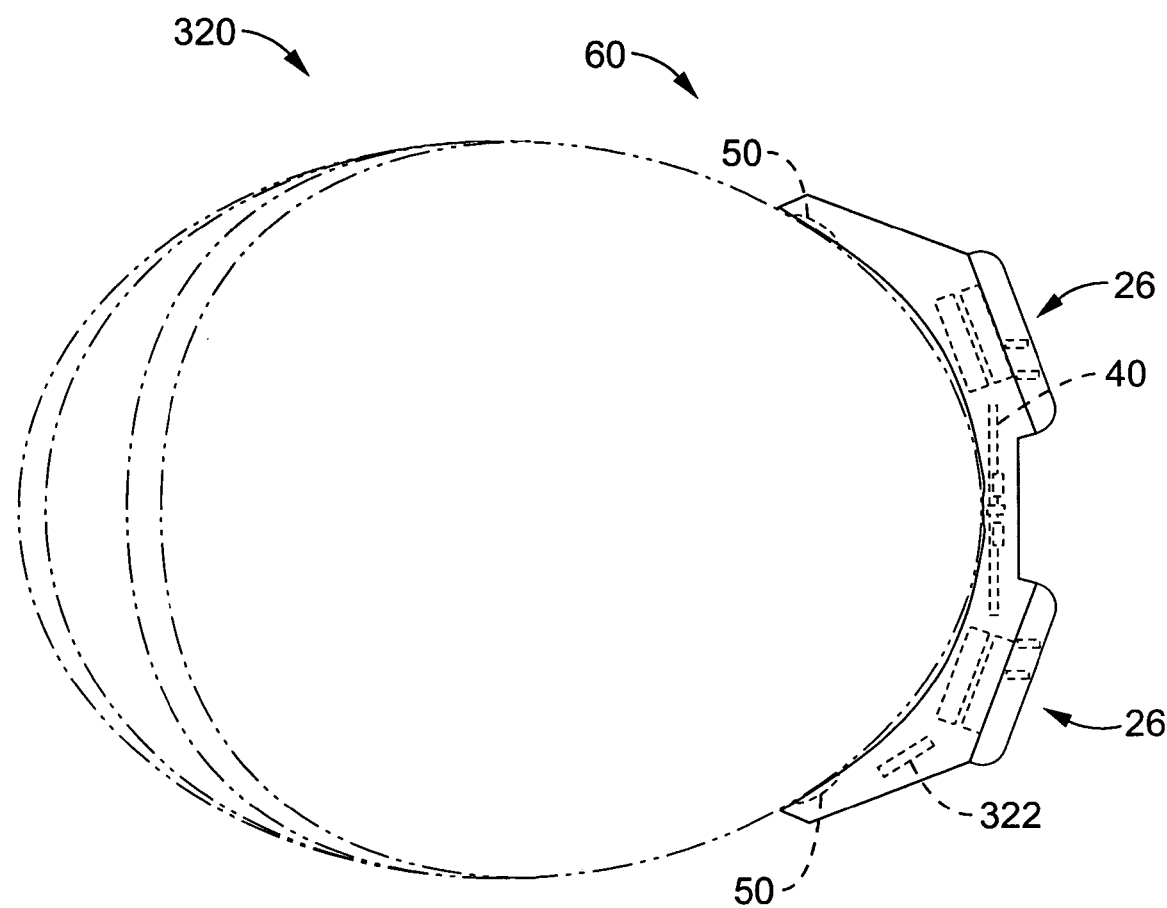

FIGS. 19A–B illustrate an embodiment of the present invention having a GPS sensor.

DETAILED DESCRIPTION OF THE INVENTION

Referring more specifically to the drawings, for illustrative purposes the present invention is embodied in the apparatus generally shown in FIG. 1A through FIG. 8B and FIG. 9B through FIG. 19B. It will be appreciated that the apparatus may vary as to configuration and as to details of the parts, and that the method may vary as to the specific steps and sequence, without departing from the basic concepts as disclosed herein.

FIGS. 1A–3 illustrate a preferred embodiment of a completely self-contained brake light system 20 that fits to the back of your motorcycle or bicycle helmet 22. Light system 20 is stand-alone and requires no wiring or splicing into the vehicle's electrical system. Light system 20 includes a frame 24 that houses a pair of LED arrays 26. The frame is also configured to house one of more horizontally oriented accelerometers 28 and/or vertical accelerometers 30. The frame also houses an on/off switch 42 and power source 44, such as a dry-cell battery. Power means may comprise a rechargeable lithium-ion battery, or disposable battery such as a 9-volt battery.

The accelerometers 28, 30, LED arrays 26, power switch 42, and power source 44 are all wired to printed circuit board (PCB) 40 and processor 41. The PCB 40 may also contain and embedded filtering software to read input from the accelerometers 28, 30.

Figure 3:
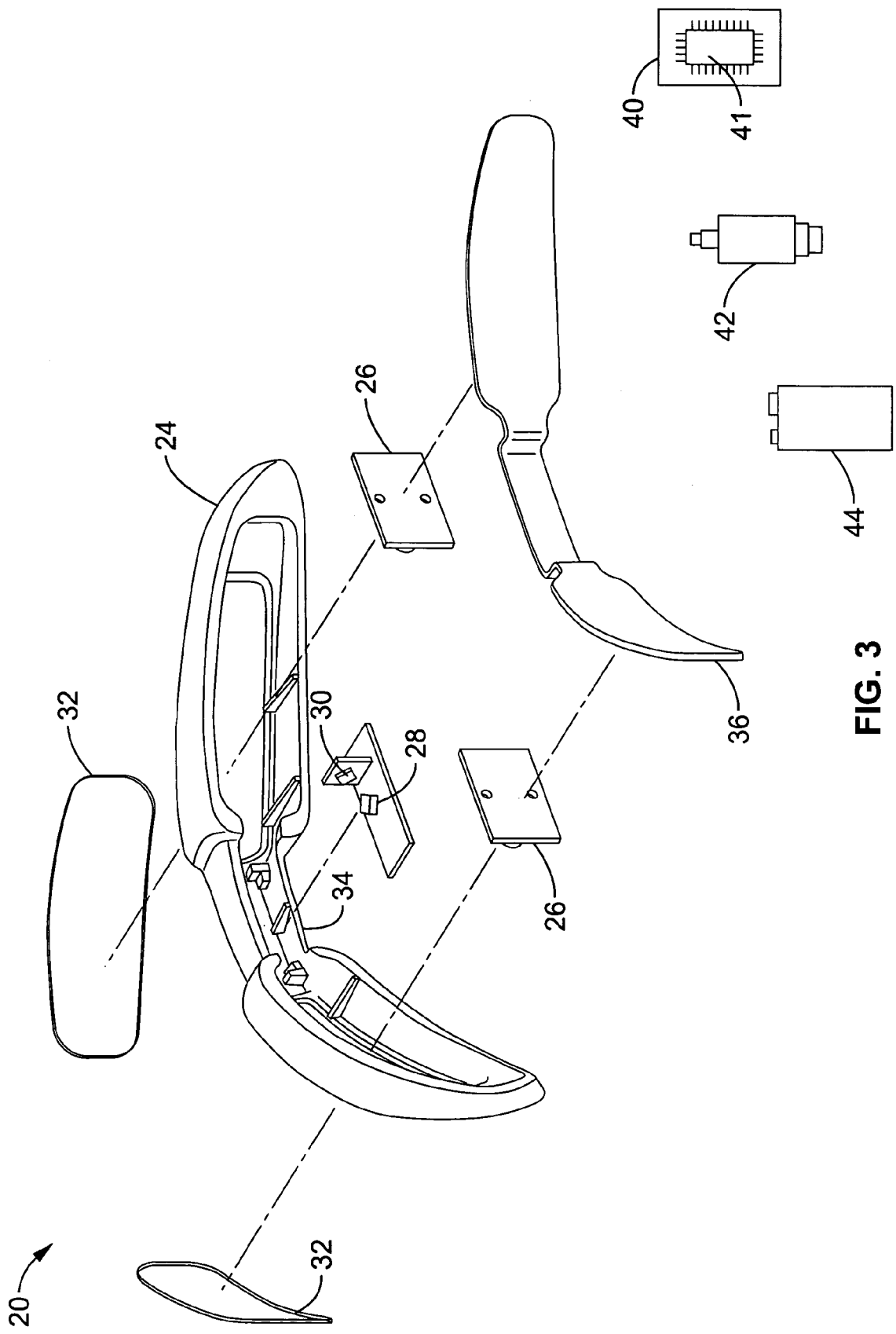
FIG. 3 illustrates an exploded view of the helmet lighting unit of the present invention.

As seen in FIG. 3, a pair of lenses 32 wrap around the front side of the frame 24 and are laterally spaced apart by bridge 34. The frame 24 and internal components are encased by rear cover 36, which is shaped to interface with the round external surface of helmet 22. Rear cover 36 preferably comprises an elastic or semi-elastic material that provides a water-tight seal to enclose the frame 24 and good contact adhesion to the helmet 22.

Light system also includes mounting tabs 50 that fixedly attach to the external surface of helmet 22. The tabs 50 may be attached to the helmet 22 via double-sided adhesive tape, adhesive, bolts, or other similar fastening means known in the art. In an alternative embodiment, the mounting tabs 50 may be integrated into the shell of the helmet.

Figure 4:
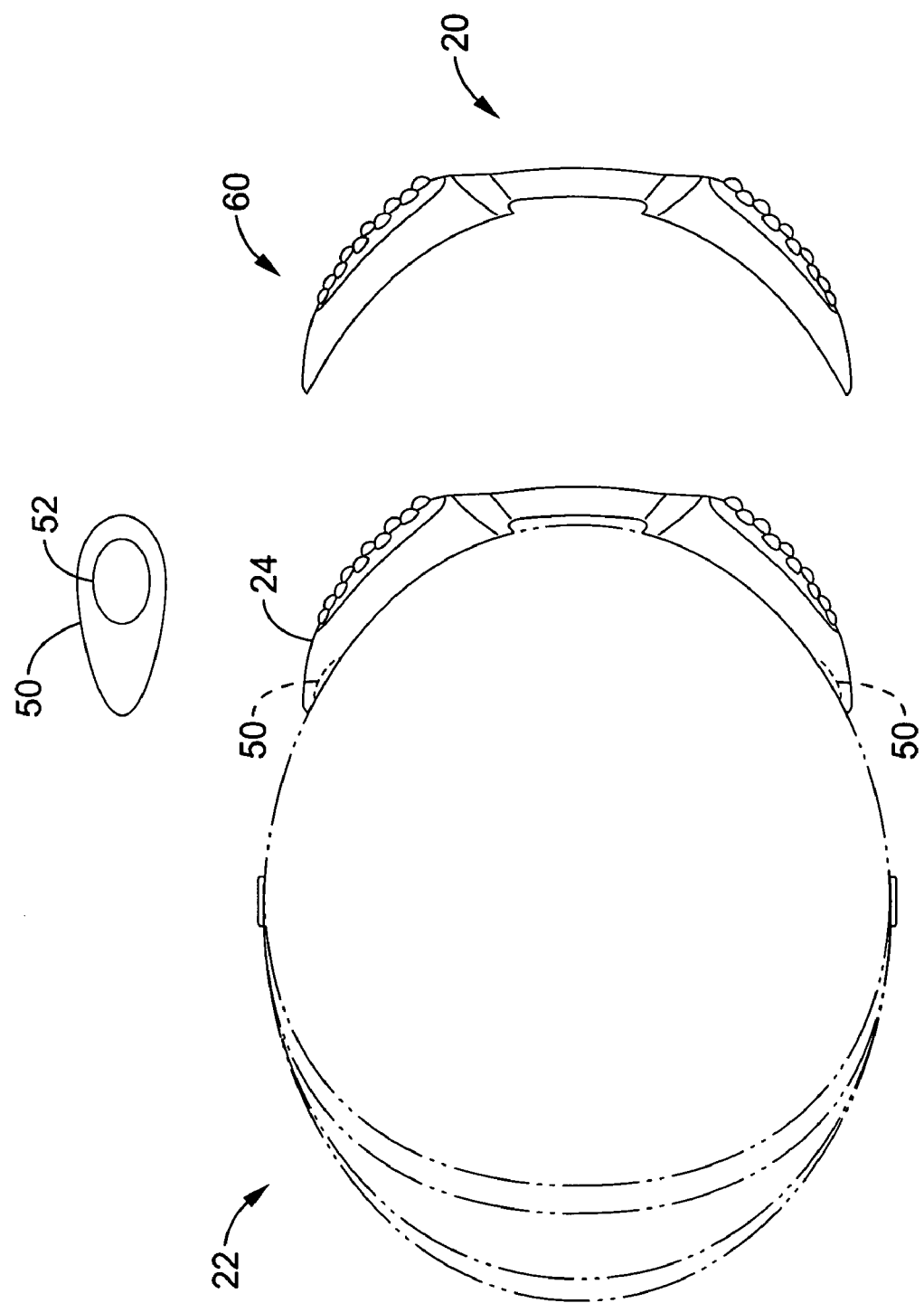
FIG. 4 illustrates the lighting unit attached to a helmet using spaced-apart mounting tabs.
Figure 5:
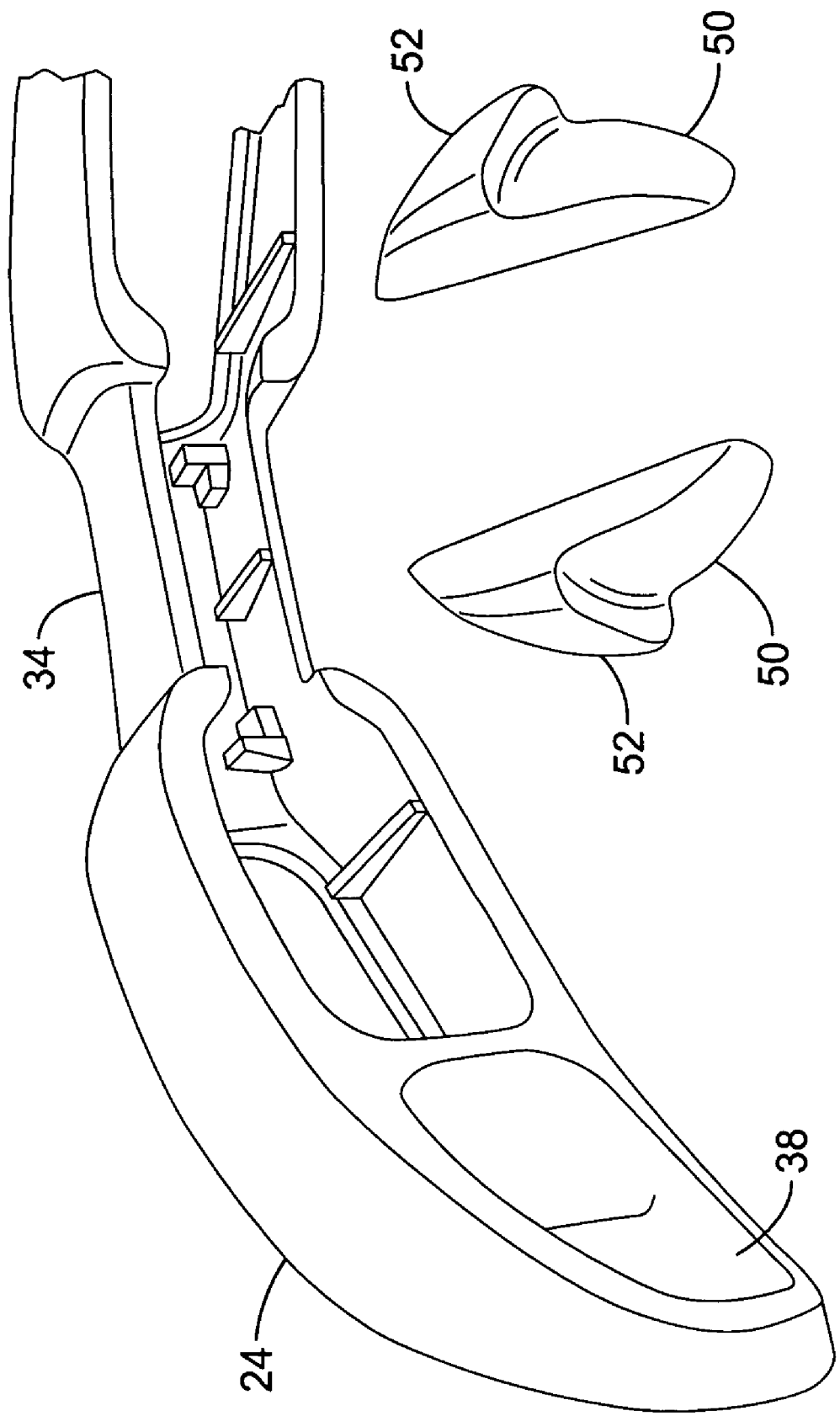
FIG. 5 illustrates the interface between the mounting tabs and the frame of the lighting unit.

In the embodiment shown in FIGS. 4 and 5, the mounting tabs 50 are spaced laterally across the back surface of the helmet 22, equidistant to the midline of the helmet. The tabs 50 have protrusions 52 configured to interlock with a pair of notched mounting recesses 38 in frame 24. To attach the lighting unit 60 to the helmet 22, the frame 24 is stretched laterally so that the mounting recesses 38 line up with the protrusions 52. The when released, the frame returns back to its pre-stretched state, locking the lighting unit 60 to the mounting tabs 50 and helmet 52. To remove the lighting unit 60 from the helmet, the frame 24 may be stretched outward to release it from the mounting tabs 50. The lighting unit 60 may then be quickly placed on a second helmet which also has a pair of mounting tabs attached. Thus, the lighting unit may be quickly and easily released from the first helmet and attached to a second helmet, e.g. the passenger helmet for maximum brake light effectiveness when riding two up.

Installation of the mounting tabs 50 to the helmet 22 does not require special tools or technical expertise. A template (not shown) may be used to create a permanent mounting position on the helmet, thus insuring proper fit with the lighting unit 60.

Figures 6A, 6B:
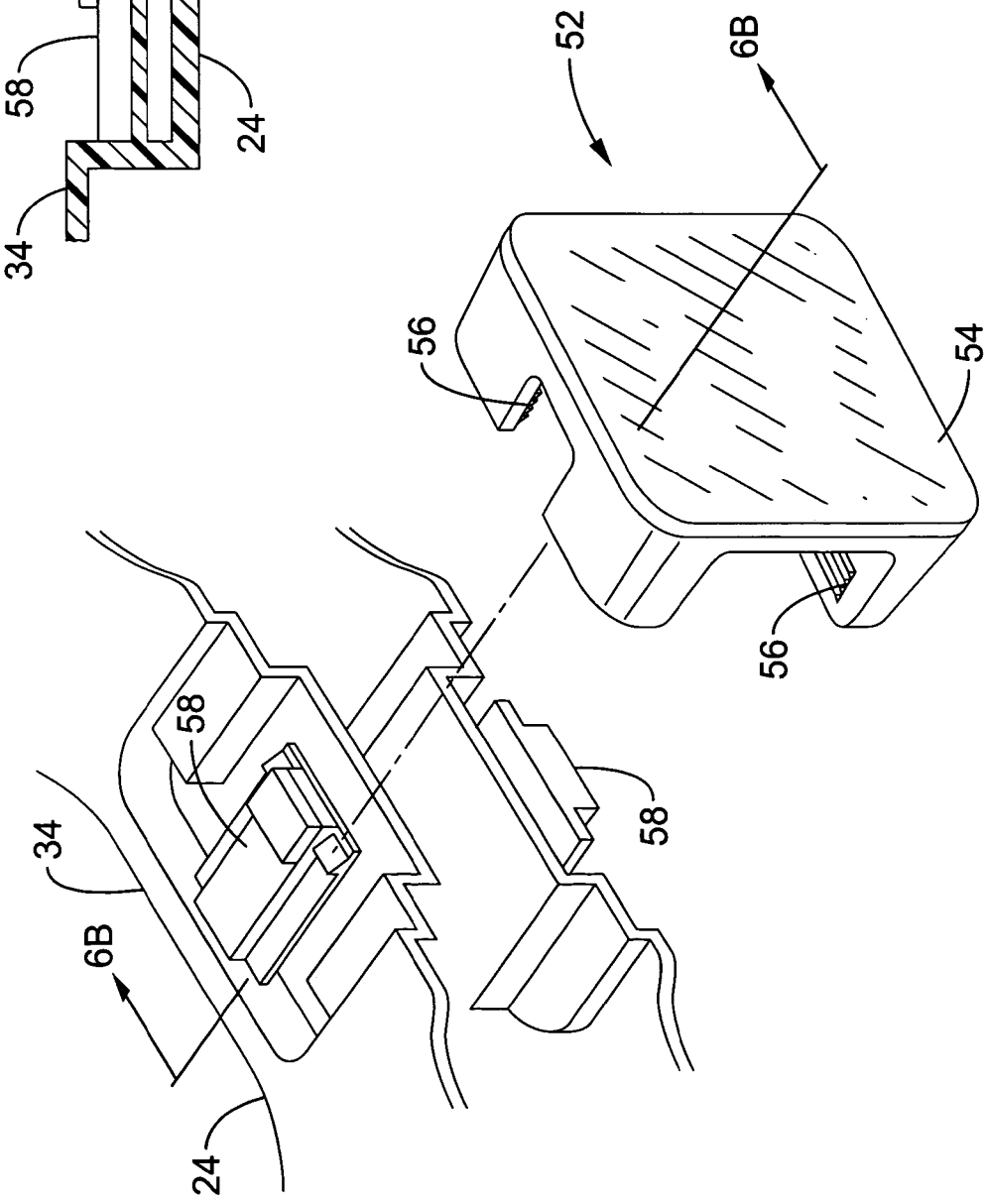
FIG. 6A shows an embodiment of the center tab and corresponding mating surface on the lighting unit frame.
FIG. 6B is a sectional view of the frame and center tab of FIG. 6A.

Now referring to FIGS. 6A and 6B, an alternative embodiment utilizing a single center tab 52. The center tab has a concave mounting surface 54 to match the outer surface of helmet 22. Surface 54 is preferably coated with a high-tack waterproof adhesive. Frame 24 has a pair of release buttons 58 positioned at the top and bottom of the frame bridge 34. The frame bridge 34 is configured to receive the center tab 52 such that the release buttons 58 lock with serrations 56 on the inside surface of the mounting tab. To release the frame 24 from the helmet 22, the release buttons 58 are pressed inward, disengaging the release buttons 58 from the serrated ledges 56 of the center tab 52.

Now referring to FIGS. 7A–C, the helmet lighting system 20 is configured to mount to a variety of DOT approved helmet configurations. For maximum efficiency, the lighting system 20 should be mounted to the helmet 22 so that the light beam is generally horizontal or parallel to the road surface 76 when the helmet is on the user's head and the user is in the normal riding configuration (as shown in FIG. 8A). Because helmets have varying degrees of tilt, the mounting tabs and lighting unit may be mounted a varying degrees with respect to the helmet to assure ideal horizontal positioning. For example, a touring style helmet 70 generally leans forward (5°–15°), sport touring helmets 72 lean farther forward (10°–20°), and sport helmets lean the farthest forward (15°–30°).

In operation, the lighting system 20 is configured to provide an improved lighting and warning system to increase the safety of the motorcycle or bicycle rider. As illustrated in FIG. 3 the power switch 42 is positioned on the bridge 34 of the frame 24 for easy access to the user. Prior to putting on the helmet, the user simply pushes the power switch 42 "on." Status indicator LED 62 at the top of the bridge 34 flashes for a brief period (e.g. 1–2 seconds) while the processor boots up. The status indicator LED 62 goes to a slow flashing mode to signal that the system is on and functioning.

With the lighting unit in the "on" state, the accelerometers 28, 30 obtain measurements of the accelerations experienced by the rider when operating the vehicle. The processor 41 analyzes the accelerometer data (described in more detail below) and sends power to the led arrays 26 when the vehicle is decelerating or stopped. Thus, the lighting system 20 is responsive to all vehicle deceleration, not just breaking by the rider. For example, many riders may not apply breaks to decelerate, but may simply let off on the gas or change gears.

Figure 1A:
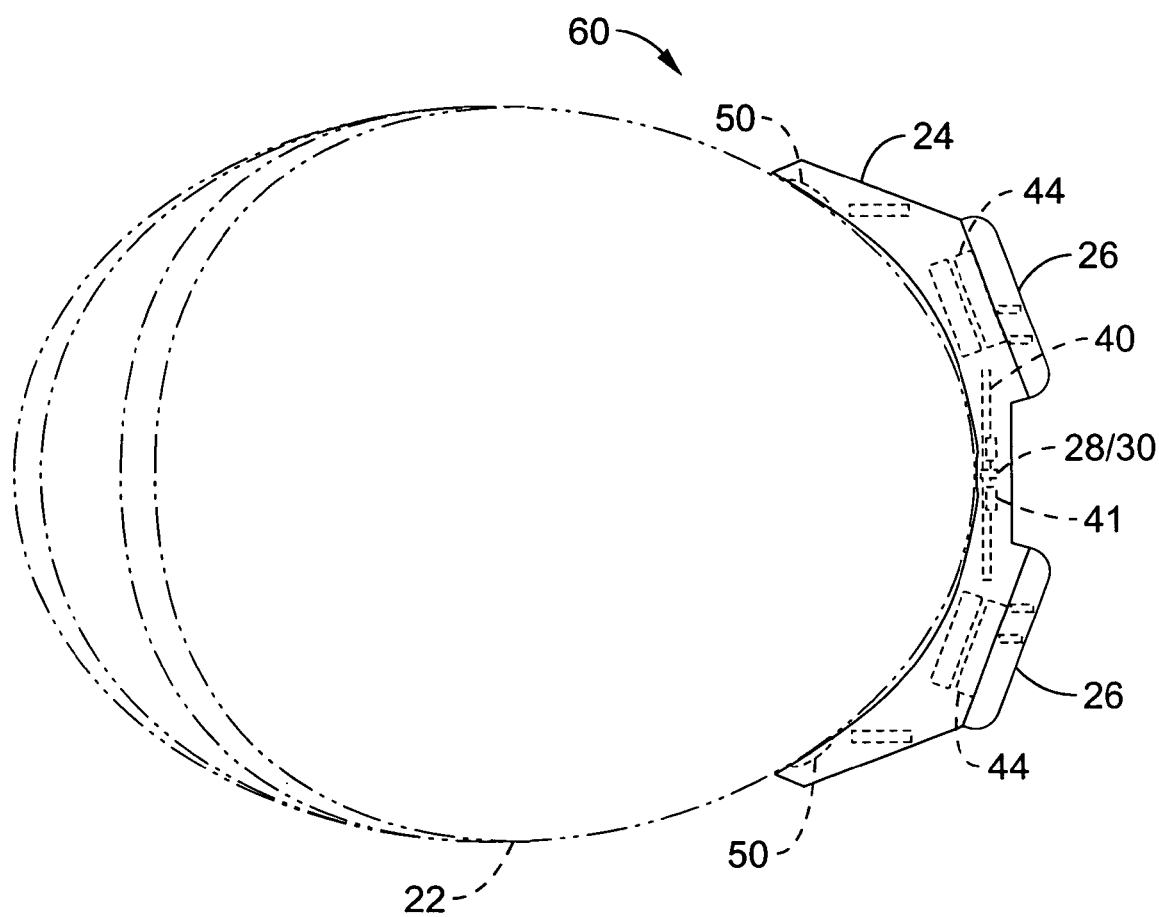
FIG. 1A is a top view of the lighting unit of the present invention mounted to a motorcycle helmet.
Figure 1B:
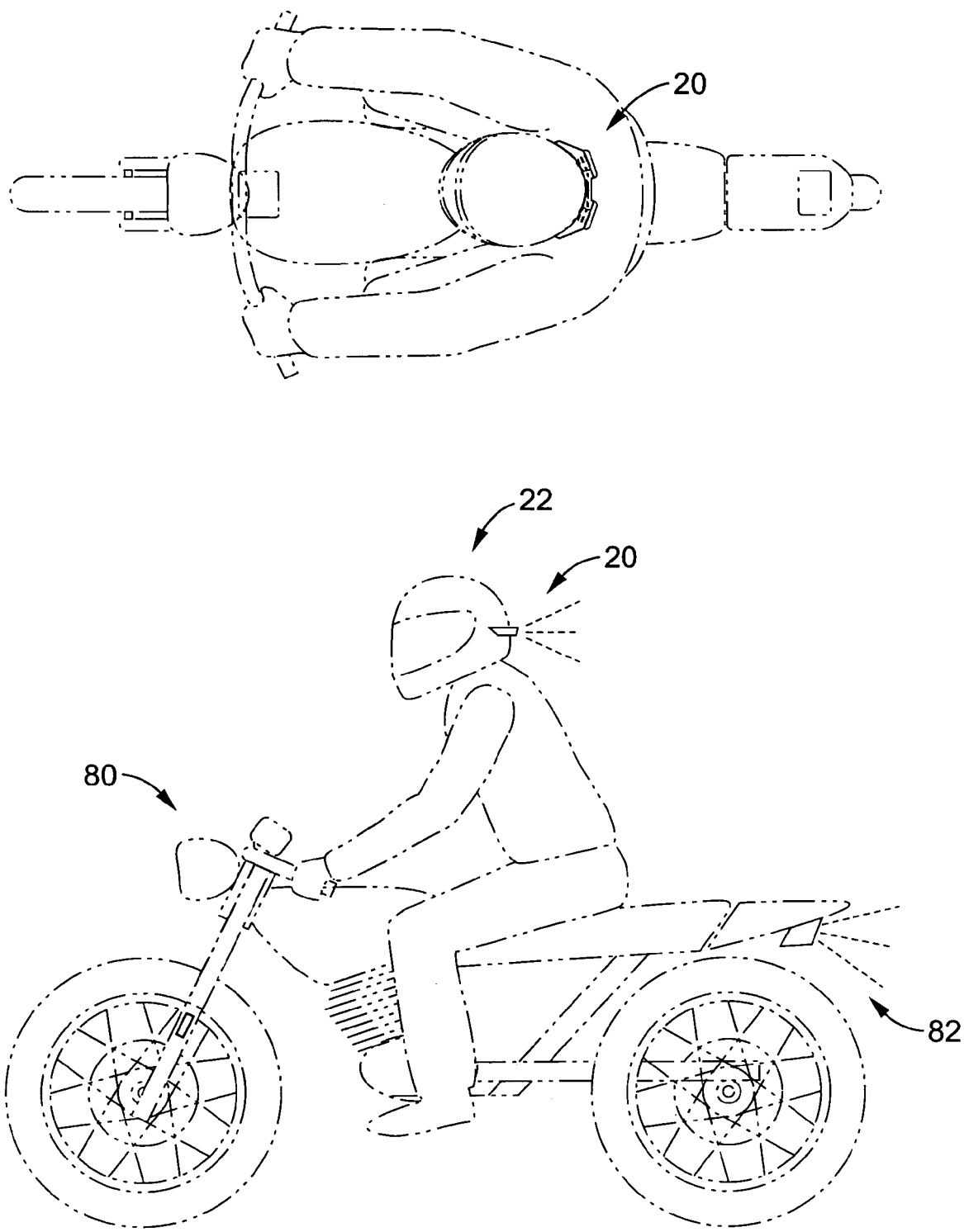
FIG. 1B is a view of a motorcycle rider wearing a helmet lighting system in accordance with the present invention.
Figure 2:
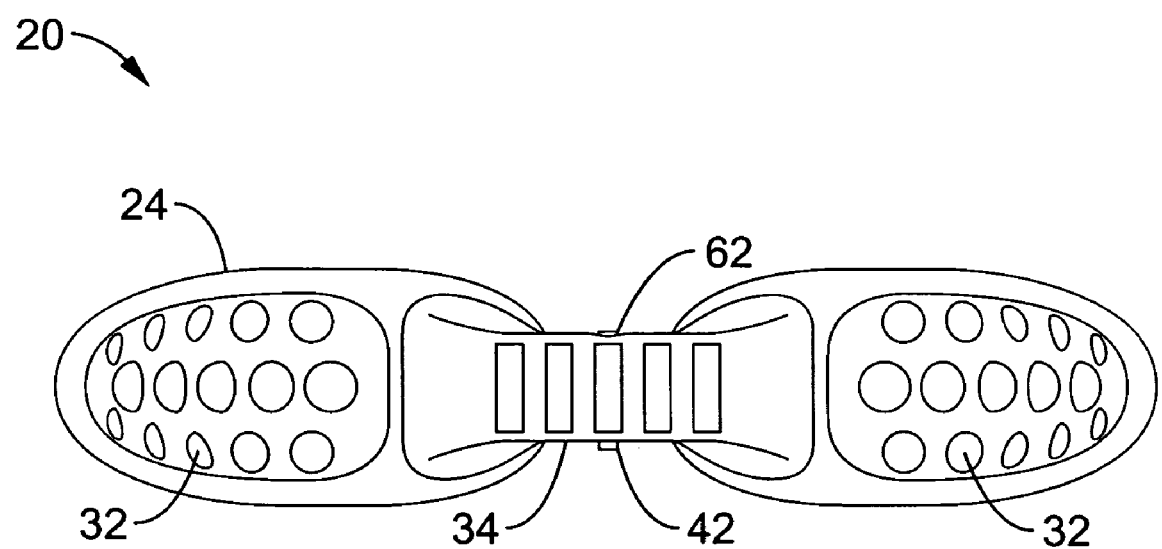
FIG. 2 is a rear view of the lighting unit in accordance with the present invention.

As seen in FIG. 1B, the helmet lighting system 20 provides an eye-level illumination source when the rider is positioned on the bike. The typical motorcycle 80 will have a taillight 82 that is generally about two feet off of the ground, much lower than eye-level for most seated motorists. With the lighting system 20 installed, the cyclist and motorcycle combine to create a two-light system, with the lighting system 20 sending a beam of light at eye-level to other motorists.

The helmet lighting system 20 also provides an increased beam spread over stock taillight 82. Referring to FIG. 9A taillight 82 emits a minimized beam of light 84 from the rear end of the motorcycle 80. In contrast, the two light design the of helmet light system 20 illustrated in FIG. 9B creates a beam spread 86 that is 250%–350% wider than the stock single tail light 82. The additional brightness from the LED arrays 26 also makes the combined braking light 2–3 times more powerful.

As shown in FIG. 7B, the LED arrays may be positioned so that they emit light at an angle θ, which is preferably at about 45°. The 45° positioning of LED arrays is designed to give the rider maximum brake light beam visibility from the rear and the side, even when turning his head.

FIGS. 10 and 11 illustrate exemplary wiring diagrams for a lighting system 20 with one horizontal accelerometer 28 and on vertical accelerometer 30. Power supply 44 comprises 3 nine-volt batteries which are coupled to LED arrays 26. LED arrays may comprise a plurality (e.g. four) of LXHL-PD01 Luxeon emitters. The arrays are coupled to the PCB board 40 and processor 41 through switch 42, such as an n-channel FET. The PCB board 40 is also couple to receive input from horizontal accelerometer 28 and vertical accelerometer 30. Accelerometers 28 and 30 preferably comprise dual-axis accelerometers that each measure accelerations in two directions. By way of example and without limitation, the accelerometers may comprise analog ADXL311 dual axis accelerometers in combination with an A/D converter, or digital ADXL202E dual axis accelerometers.

Because the helmet 22 experiences a variety of motion effects that are independent of the acceleration/deceleration of the vehicle, helmet lighting system 20 is configured to filter out certain readings obtained by the accelerometers 28, 30. For the purposes of explaining changes in orientation of the motorcycle helmet, the following descriptions of helmet movement and position during various riding situations apply in relation to FIG. 12. All indications of degree will be based on three axes tilt, lean and turn.

Tilt is the forward angle of the helmet about the transverse axis 84 when viewing the rider from the side. The helmet 22 invariably leans forward, bracing the head from forward and backward force and form the wind pushing against the helmet when traveling.

Lean is side to side motion of the helmet 22 about the longitudinal axis 86 when viewing the rider from the rear. This leaning happens most often with the rider is leaning with the bike when leaning into and out of a turn. Also leaning happens when checking rearview mirrors, glancing over to other lanes of traffic as well as arbitrary and unnecessary head movement.

Turn is the rotation angle of the helmet 22 about the vertical axis when viewing the rider from above. Turning of the helmet 22 occurs often during heading into and out of turns, looking at traffic movement and changes in other lanes, checking for cross traffic at intersections, checking rearview mirrors as well as arbitrary and unnecessary head movement.

Depending on the driving conditions, the data acquisition process for the processor 40 will vary. When riding at slow speeds the computer 40 actually processing more information than at high speeds. This is due to the extra head movements associated with city or 'in town' riding. The sensitivity of the accelerometers is also much greater than what will be required for high speed driving. Movements that are associated city driving range from: checking over the shoulder for lane changes; looking side to side for cross traffic, frequent checking of side view mirrors; low speed turns (steep angle, slow speed); and maneuvering, dodging between cars. In addition to the turning and leaning aspects of city riding there are frequent stops and starts. It is this type of riding that will require the most information processing.

One slow speed scenario that the filtering software is configured to properly filter is repeating stop signs or repeating traffic signals (or controlled intersections). The case of stopping at stop signs and pulling away is assumed standard activity with predictable behavior. A less predictable situation is a motorcycle rider coming up to a stop sign with several cars already stopped ahead and inching his way up to the intersection stop line. In this case the helmet light should come on as deceleration occurs when coming up to the line of cars, and sty on while the bike is at low speeds until it pulls away, accelerating up to near city traffic speeds (12–15 mph). The status of the helmet light during activity below 10 mph should be determined by entry. For example off from Omph, on from over 10 mph.

For stop and go traffic, whether in the city or on the freeway, it may be desirable to have the helmet light to remain on while under 10–12 mph. In stop and go traffic on the freeway this can go on for some time. The helmet light software is configured to differentiate between arriving in stop and go from city speeds and freeway speeds.

Medium speeds scenarios typically occur on residential streets, parkways, causeways and boulevards where the rider doesn't reach freeway speeds but is frequently traveling from 45–55 mph with occasional interruptions by traffic signal stops. Also there is slowing due to other traffic entering and exiting the roadway and frequent bursts of speed for both safety and pleasure. This is a riding environment that sees the greatest changes of speed most often.

At higher speeds, there is generally a more relaxed state of riding allowing head turns toward buildings, sunsets or other scenery. The software may be programmed to control triggering of the helmet light. For example; if the rider is traveling at 50 mph and turns his head to seethe scenery with no change in speed, such motion is filtered and the helmet light remains off. Yet if the rider's head turns as he decelerates, the software should activate the helmet light because the rider is probably slowing in response to peripheral activity.

Typically, the helmet light is used the least during high speed driving. Yet, each high-speed status, or sequence, will be bracketed by rider behavior that will require helmet light activity. For example, deceleration associated with getting off the freeway. This is most often followed by an abrupt stop at either a stop sign or traffic signal.

FIG. 13 illustrates a preferred embodiment of the software filtering architecture 100. The software analyzes the data from the accelerometers. For example, an exemplary accelerometer configuration may be four accelerometers: two pointing forward left and right in a horizontal plane; and two pointing forward up and down in a vertical plane.

At the startup block 102, the brake light is turned on and the bike is assumed to be at rest. The accelerometers are first calibrated at block 104. After approximately one-half second, the application begins continuously acquiring and processing accelerometer data, shown at block 106. The acceleration data is first low-pass filtered at block 108 to eliminate noise. The low-pass filter is configured to remove unwanted artifact such as road noise and helmet movement associated with the rider's head movement. Once filtered, the signal is then down-sampled to 100 Hz at block 110.

If all four down-sampled accelerations are then less than a threshold value, the bike is considered to be decelerating, and the brake light is turned on as shown in block 112. If instead, all four down-sampled accelerations are greater than the inverse of that same threshold, the bike is regarded as accelerating, and the brake light is turned off at block 114. Otherwise, if some or all of the accelerations are within those limits, the bike is considered to be moving at a constant speed or stopped, and the brake light status remains unchanged.

Referring to FIG. 14, an alternative software architecture 120 is illustrated. This configuration uses a high-pass filer in addition to a low-pass filter for analyzing the raw data from the accelerometers. First, raw accelerometer data is sampled at 500 Hz at block 122. The raw data is low-pass filtered and down-sampled to 100 Hz at block 126. The smoothed accelerations are then evaluated at block 126 and compared to threshold values. If all accelerations are less than zero and the sum of all accelerations less than 0.1 g, then the vehicle is assumed to be decelerating and the brake light is turned on.

However, it is also desirable to have the brake lights on when the vehicle is stopped, or velocity V=0. Although the velocity may be calculated by integrating the acceleration values, such an approach generally requires an initial velocity Vo that is tracked over time. If any errors are introduced from false accelerometer readings, then the velocity value may become skewed, creating either false positive or false negative triggers to the light.

To provide an additional input to determine whether the bike is moving or at rest, a high pass filter 132 is also incorporated. The high-pass filter 132 works on the assumption that a moving motorcycle will have high frequency vibrations associated with road discontinuities and that actual bike deceleration/acceleration and head movement will likely be more sustained motion (i.e. low frequency). The filtered road noise is then evaluated at block 134. If the road noise is greater than 1.2 times the stationary road noise value obtained from the calibration step 104 at startup, then the bike is assumed to be moving, and the brake light is off unless a low frequency deceleration event is triggered at 128. If the road noise is less than 1.2 times the stationary road noise value, then the bike is assumed to be at rest, and the brake light is off.

An exemplary software code detailing the accelerometer calibration and brake light algorithm is as follows:

```
double lowPassNumCoeff[ ] =
{
    3.9471359302932136e-006,
    7.8942718605864271e-006,
    3.9471359302932136e-006
};
double lowPassDenCoeff[ ] =
{
    1.0000000000000000e+000,
    -1.9943727618943083e+000,
    9.9438855043802954e-001
};
UINT ReadThread(LPVOID pParam)
{
    CZNDataDlg* pDlg = (CZNDataDlg*) pParam;
    float dcOffset[MAX_NUM_CHANNELS];
    double oldSmoothAccel_2[MAX_NUM_CHANNELS];
    double oldSmoothAccel_1[MAX_NUM_CHANNELS];
    int i;
    // calculate no. samples used for calibration
    int numCalSamples = pDlg->m_BufferSize * (int) ceil(CALIBRATION_TIME_SEC * pDlg->m_SampleFreqHz / pDlg->m_BufferSize);
    // for down sampling to 100Hz
    int downSampleFactor = (int)(pDlg->m_SampleFreqHz / 100.0);
    bool calibrationInProgress = true;
    bool firstTimeThrough = true;
    // have not yet renamed variables, so use old velocity thresh as new zero of acceleration
    double zeroAccel = pDlg->m_VelocityThreshMPH / 100.0 * VOLTS_PER_G;
    float (*oldAccel)[MAX_NUM_CHANNELS] = new float[pDlg->m_BufferSize][MAX_NUM_CHANNELS];
    if(!oldAccel)
        goto exit;
    // initialize DC offsets and smoothed accelerations and road noise from previous buffer
    // (assumes we're not moving at start)
    for(i = 0; i < pDlg->m_NumChannels; i++)
    {
        dcOffset[i] = 0.0;
        oldSmoothAccel_2[i] = 0.0;
        oldSmoothAccel_1[i] = 0.0;
        for(int j = 0; j < HIGH_PASS_ORDER; j++)
        {
            oldRoadNoise[j][i] = 0.0;
                oldSquaredRoadNoise[j][i] = 0.0;
        }
        for(j = 0; j < RMS_ORDER; j++)
            oldRmsRoadNoise[j][i] = 0.0;
    }
    // again, assume we always begin at rest
    TurnBrakeLight(ON);
    while(!pDlg->m_bAbort)
    {
        // is external stop button pressed?
        if(pDlg->ExternalButtonIsPressed( ))
        {
```

-continued

```
                pDlg->StopSampling( );
                goto exit;
            }
            if(pDlg->m_SamplesAvailable > pDlg->m_BufferSize)
            {
                errorCode = DataqGetStreamedDataFromBuffer(0, pDlg->m_BufferSize, &g_SampleArrayVolts);
                if(errorCode)
                {
        DataqShowError(_T("DataqGetStreamedDataFromBuffer"),errorCode);
                    pDlg->StopSampling( );
                    goto exit;
                }
                pDlg->m_SamplesSoFar += pDlg->m_BufferSize;
                for(int ch = 0; ch < pDlg->m_NumChannels; ch++)
                {
                    // Here is where we have a chunk of new data available for processing
                    // New data is in g_SampleArrayVolts[ch][n], where n = 0 to pDlg->m_BufferSize – 1.
                    // channel 0 (violet) = X
                    // channel 1 (yellow) = Y
                    // channel 2 (orange) = Up
                    // channel 3 (blue) = Down
                    if(calibrationInProgress)
                    {
                            for(i = 0; i < pDlg->m_BufferSize; i++)
                        {
                    // accumulate DC offset
                            dcOffset[ch] += g_SampleArrayVolts[ch][i];
                        }
                        // see if we're finished calibrating this channel
                        if(pDlg->m_SamplesSoFar >= numCalSamples)
                        {
                            dcOffset[ch] /= pDlg->m_SamplesSoFar;
                            // see if all channels now calibrated
                            if(ch >= pDlg->m_NumChannels – 1)
                            {
                            calibrationInProgress = false;
                            pDlg->m_Status.SetWindowText(_T("calibration complete"));
                            }
                        }
                    }
                    else
                    {
                        // invert raw data (since accelerometers labeled backwards) & subtract DC offsets
                        for(i = 0; i < pDlg->m_BufferSize; i++)
                        {
                            g_SampleArrayVolts[ch][i] = dcOffset[ch] – g_SampleArrayVolts[ch][i];
                        }
                    }
                }
                if(!calibrationInProgress)
                {
                    if(firstTimeThrough)
                    {
                        // skip first buffer after calibration, since old data doesn't yet have offsets subtracted
                        firstTimeThrough = false;
                    }
                    else
                    {
                        // !!!!!!!!!!!!!!!!!!!!!!!!!!!!!!!!!!!!!!!!!!!!!!!!!!!!!!!!!!!!!!!!
                        // start of brake light algorithm
                        // !!!!!!!!!!!!!!!!!!!!!!!!!!!!!!!!!!!!!!!!!!!!!!!!!!!!!!!!!!!!!!!!
                        double smoothedAccel[MAX_NUM_CHANNELS];
                        double accelSum;
                        for(i = 0; i < pDlg->m_BufferSize; i++)
                        {
                            accelSum = 0.0;
                            for(ch = 0; ch < pDlg->m_NumChannels; ch++)
                            {
```

-continued

```
                        // low-pass filter acceleration data to eliminate noise
                        smoothedAccel[ch] = 0.0;
                        for(int k = 0; k < sizeof(lowPassNumCoeff) / sizeof(double); k++)
                        {
                                // handle indexing into old data buffer
                                // (this assumes our buffer size is large enough & filter short enough
                                // that we never need more than 1 old buffer's worth of data)
                                int index = i − k;
                                if(index < 0)
                                {
                                        smoothedAccel[ch] += lowPassNumCoeff[k] * oldAccel[pDlg->m_BufferSize + index][ch];
                                }
                                else
                                {
                                        smoothedAccel[ch] += lowPassNumCoeff[k] * g_SampleArrayVolts[ch][index];
                                }
                        }
                        smoothedAccel[ch] −= lowPassDenCoeff[1] * oldSmoothAccel_1[ch] + lowPassDenCoeff[2] * oldSmoothAccel_2[ch];
                        // save last two smoothed accelerations
                        oldSmoothAccel_2[ch] = oldSmoothAccel_1[ch];
                        oldSmoothAccel_1[ch] = smoothedAccel[ch];
                        accelSum += smoothedAccel[ch];
                }
                // downsample to 100Hz before checking for braking condition
                if(!(i % downSampleFactor))
                {
                        if((smoothedAccel[0] < zeroAccel) &&
                                (smoothedAccel[1] < zeroAccel) &&
                                (smoothedAccel[2] < zeroAccel) &&
                                (smoothedAccel[3] < zeroAccel))
                        {
                                // bike is decellerating
                                TurnBrakeLight(ON);
                        }
                        else
                        {
                                // bike is not decellerating
                                // only turn light off if we're actually accelerating
                                // (between the + & − thresholds, we keep the light in whatever state it was
                                if((smoothedAccel[0] > −zeroAccel) &&
                                        (smoothedAccel[1] > −zeroAccel) &&
                                        (smoothedAccel[2] > −zeroAccel) &&
                                        (smoothedAccel[3] > −zeroAccel))
                                {
                                        // bike is accelerating
                                        TurnBrakeLight(OFF);
                                }
                        }
                }
        }
        // !!!!!!!!!!!!!!!!!!!!!!!!!!!!!!!!!!!!!!!!!!!!!!!!!!!!!!!!!!!!!!!!!!
        // end of brake light algorithm
        // !!!!!!!!!!!!!!!!!!!!!!!!!!!!!!!!!!!!!!!!!!!!!!!!!!!!!!!!!!!!!!!!!!
        }
}
// unscramble data for saving in file
// also copy current data to old data buffer, for use in filtering algorithms
float* pSample = g_SamplesToFile;
for(i = 0; i < pDlg->m_BufferSize; i++)
{
        for(int ch = 0; ch < pDlg->m_NumChannels; ch++)
        {
```

```
                *pSample++ = oldAccel[i][ch] = g_SampleArrayVolts[ch][i];
                if(i < HIGH_PASS_ORDER)
                {
                        oldRoadNoise[i][ch] = roadNoise[pDlg->m_BufferSize -
HIGH_PASS_ORDER + i][ch];
                        oldSquaredRoadNoise[i][ch] = squaredRoadNoise[pDlg->
m_BufferSize - HIGH_PASS_ORDER + i][ch];
                }
                if(i < RMS_ORDER)
                        oldRmsRoadNoise[i][ch] = rmsRoadNoise[pDlg->
>m_BufferSize - RMS_ORDER + i][ch];
```

In the embodiment shown in FIGS. 15A–B an alternative helmet light system 200 incorporates a wheel speed indicator to measure the wheel speed of the motorcycle to evaluate when the light is turned on or off. The wheel speed indicator uses similar technology as bicycle computers commonly used in the art. The light system 200 has a wheel speed sensor 204 mounted on the fork of the motorcycle that senses each rotation of wheel 206 as magnet 202 passes by sensor 204. The sensor unit 204 then emits an RF signal that is received by RF transceiver 206 on the lighting unit 60. This signal is then sent to processor 40 to determine if the bike is not moving, or decelerating, in which case the LED arrays 26 are turned on. Although the unit may work without acceleration data, input from the accelerometers 28, 30 may be used to cross-reference the wheel-speed indicator data, or vise versa.

In another alternative embodiment shown in FIGS. 16A–B an alternative helmet light system 250 incorporates a vehicle-based accelerometer to evaluate when the light is turned on or off. The light system 250 has a motorcycle-mounted accelerometer unit 252, which has an RF transmitter that emits an RF signal. The RF signal is received by RF transceiver 254 on the lighting unit 60. This signal is then sent to processor 40 to determine if the bike is not moving, or decelerating, in which case the LED arrays 26 are turned on. The advantage of this configuration is that head/helmet motion is eliminated.

FIGS. 17A–B illustrate a helmet light system 260 for attachment to a bicycle helmet 268. The system 260 incorporates the wheel speed of the bicycle to evaluate when the light is turned on or off. The light system 260 has a wheel speed sensor 262 that senses each rotation of wheel 270 as magnet 264 passes by sensor 262. The sensor unit 262 then emits an RF signal that is received by RF transceiver 266, and display console 272, which displays the velocity and or mileage to the rider. This signal received by RF transceiver 266 is then sent to processor 40 to determine if the bike is at rest, or decelerating, in which case the LED arrays 26 are turned on.

In an alternative embodiment shown in FIGS. 18A–B, a law-enforcement helmet light system 300 incorporates the wheel speed of the motorcycle to evaluate when the light is turned on or off, and also has a perimeter sensor. The light system 300 has a wheel speed sensor 304 mounted on the fork of the motorcycle. Sensor 304 senses each rotation of wheel 306 as magnet 308 passes by sensor 304. The sensor unit 304 then emits an RF signal that is received by RF transceiver 312 on lighting unit 60. This signal is then sent to processor 40 to determine if the bike is not moving, or decelerating, in which case the LED arrays 26 are turned on. Although the unit may work without acceleration data, input from the accelerometers 28, 30 may be used to cross-reference the wheel-speed indicator data, or vise versa.

The light system 300 also has a vehicle control unit that senses the position of the helmet, and sends a signal to turn on a blue light LED 314 located on the lighting unit 302 if the helmet 22(i.e. law enforcement officer) is out of a localized radius from the bike.

It is appreciated that while RF transmitters and receivers are preferred, any known remote transmitter available in the art may be used for sending the remote signal. For example, IR emitters and receivers may be used to send wheel speed or acceleration data from a remote location to the processor 41 located on the helmet. Alternatively, the vehicle mounted unit may house the processor, and thus transmit a signal to lighting unit 60 to power the light on and off.

FIGS. 19A–B illustrate another alternative helmet lighting system 320 that incorporates a GPS (Global Positioning System) tracking device installed in the lighting unit 60 to determine vehicle speed and deceleration. The system 320 has a GPS receiver 322 that downloads real-time position data from a GPS satellite network. Once position data is downloaded from receiver 322, it is sent to processor 40 for velocity and acceleration calculation. The system may use the GPS algorithms currently known in the art, or additional optimization routines to calculate velocity and deceleration to turn on LED arrays 26 when the vehicle is stopped or decelerating. Other GPS enhancements like DGPS and enhancements like Rosum's TV signal processing might be used to improve performance.

Although the description above contains many details, these should not be construed as limiting the scope of the invention but as merely providing illustrations of some of the presently preferred embodiments of this invention. Therefore, it will be appreciated that the scope of the present invention fully encompasses other embodiments which may become obvious to those skilled in the art, and that the scope of the present invention is accordingly to be limited by nothing other than the appended claims, in which reference to an element in the singular is not intended to mean "one and only one" unless explicitly so stated, but rather "one or more." All structural, chemical, and functional equivalents to the elements of the above-described preferred embodiment that are known to those of ordinary skill in the art are expressly incorporated herein by reference and are intended to be encompassed by the present claims. Moreover, it is not necessary for a device or method to address each and every problem sought to be solved by the present invention, for it to be encompassed by the present claims. Furthermore, no element, component, or method step in the present disclosure is intended to be dedicated to the public regardless of whether the element, component, or method step is explicitly recited in the claims. No claim element herein is to be construed under the provisions of 35 U.S.C. 112, sixth paragraph, unless the element is expressly recited using the phrase "means for."

What is claimed is:

1. A lighting system adapted to mount on a helmet of a person riding a motorcycle or bicycle, comprising:
   a first accelerometer coupled to the helmet;
   a processor coupled to the first accelerometer, the processor adapted to process a signal from the first accelerometer; and
   a light connected to the processor, the light being mounted on the helmet and responsive to the signal from the processor such that the light illuminates as result of a deceleration force;
   wherein the processor comprises a fitter for filtering the signal from the first accelerometer;
   wherein filter is configured to filter out data other than road noise to obtain a road noise signal;
   wherein the processor is adapted to evaluate the road noise signal to determine if the rider is at rest.

2. A lighting system as recited in claim 1, further comprising a power source coupled to the processor and light.

3. A lighting system as recited in claim 1, further comprising a power switch coupled to the power source for turning the system on and off.

4. A lighting system as recited in claim 1, wherein the filter comprises a low-pass filter.

5. A lighting system as recited in claim 4, wherein the low-pass filter is configured to remove helmet motion artifact.

6. A lighting system as recited in claim 1, wherein the filter further comprises a high-pass filter.

7. A lighting system as recited in claim 6, wherein the high-pass filter is configured to filter out data other than road noise.

8. A lighting system as in claim 1, wherein the light is responsive to the processed signal such that the light turns on when the rider is at rest.

9. A lighting system as recited in claim 1, wherein the light comprises a first LED array.

10. A lighting system as recited in claim 9, wherein the light comprises a second LED array.

11. A lighting system as recited in claim 10, wherein the light comprises a pair of refracting lenses covering the first and second LED arrays.

12. A lighting system as recited in claim 11, wherein the lenses are positioned to generate light beams at a 45 degree angle.

13. A lighting system as recited in claim 10, wherein the second LED array is spaced apart from the first LED array.

14. A lighting system as recited in claim 1, further comprising a second accelerometer, wherein the second accelerometer is positioned substantially perpendicular to the first accelerometer.

15. A lighting system as recited in claim 14, wherein the first accelerometer is positioned substantially horizontally and the second accelerometer is positioned substantially vertically.

16. A lighting system as recited in claim 15, wherein:
   the first and second accelerometers are dual-axis accelerometers that both measure accelerations in two orthogonal axes.

17. A lighting system as recited in claim 1, further comprising:
   a wheel speed sensor adapted to be mounted to the fork of the bicycle or motorcycle;
   wherein the wheel speed sensor is adapted to emit a signal having wheel speed data; and
   a receiver coupled to the processor, the receiver configured to receive the emitted wheel speed sensor signal for processing by the processor;
   wherein the processor is adapted to process the accelerometer signal and the wheel speed signal to determine the velocity and acceleration of the rider.

18. A lighting system as recited in claim 1, further comprising:
   a base configured to house the processor, accelerometer and light; and
   a mounting tab attached to the helmet and configured to releasably attach the base to the helmet.

19. A lighting system as recited in claim 18, wherein the lighting system is self contained in the attachable base; and
   wherein the base is configured to contour the external shape of the helmet.

20. A lighting system as recited in claim 1, wherein the accelerometer is mounted to a location on the motorcycle, the lighting system further comprising:
   an RF transmitter connected to the accelerometer, the transmitter configured to send an RF signal having data acquired by the accelerometer;
   an RF receiver connected to the processor on the helmet, the RF receiver configured to receive the emitted accelerometer signal for processing by the processor.

21. A method for generating a brake light signal on a helmet adapted to be worn by a person operating a motor vehicle, comprising:
   acquiring accelerometer data from one or more accelerometers positioned on the helmet;
   filtering the accelerometer data;
   comparing said filtered accelerometer data to a threshold value;
   sending a signal to turn said brake light on or off in response to the filtered accelerometer data crossing said threshold value;
   wherein said brake light is positioned at a rearward section of the helmet;
   wherein filtering the accelerometer data also comprises filtering out data to obtain a road noise signal; and
   evaluating the road noise signal to determine if the rider is at rest.

22. A method as recited in claim 21, wherein filtering the accelerometer data further comprises applying a low pass filter to remove head and vibration induced artifact; and
   wherein the filtered signal corresponds to deceleration and acceleration of the motorcycle or bicycle.

23. A method as recited in claim 21, wherein the filtered signal is down-sampled prior to comparison to the threshold value.

24. A method as recited in claim 21, further comprising calibrating the accelerometers prior to the step of filtering the accelerometer data.

25. A method as recited in claim 21, wherein acquiring accelerometer data comprises acquiring data from a plurality of accelerometers.

26. A method as recited in claim 25, wherein acquiring data from a plurality of accelerometers comprises acquiring data from one or more accelerometers positioned horizontally on the helmet and one or more accelerometers positioned vertically on the helmet.

27. A method as recited in claim 25, wherein the brake light is turned on in response to the filtered accelerometer data having a value of less than zero for all the accelerometers, and a value of less than 0.1 g for the sum of all accelerometer values.

28. A method as recited in claim 25, wherein the brake light is turned off in response to the filtered accelerometer data having a value of greater than zero for all the accelerometers, and a value of more than 0.1 g for the sum of all accelerometer values.

29. A method as recited in claim 22, wherein filtering the accelerometer data further comprises applying a high-pass filter to the acquired accelerometer data;
    wherein the high-pass filtered signal corresponds to road noise imparted on the accelerometer.

30. A method as recited in claim 29, wherein the brake light is turned on in response to a road noise value less than 1.2 times a calibrated road noise value.

31. A method for generating a brake light signal on a helmet adapted to be worn by a person operating a vehicle, comprising:
    acquiring accelerometer data from one or more accelerometers positioned on the helmet;
    filtering the accelerometer data;
    comparing said filtered accelerometer data to a threshold value;
    sending a signal to turn said brake light on or off in response to the filtered accelerometer data crossing said threshold value;
    wherein said brake ligth is positioned at a rearward section of the helmet;
    acquiring wheel velocity data from a wheel speed indicator mounted on the vehicle; and
    comparing the wheel velocity data with the filtered accelerometer data.

32. A method as recited in claim 31, wherein acquiring wheel velocity data from a wheel speed indicator comprises:
    sensing the wheel speed of the vehicle;
    transmitting the wheel speed from a location on the vehicle; and
    receiving the wheel speed signal at a location on the helmet.

33. A lighting system adapted to mount on a helmet of a person riding a motorcycle, the lighting system comprising:
    a rotational sensor adapted to be mounted on a fork and wheel of the motorcycle, the rotational sensor configured to acquire wheel speed data;
    a transmitter connected to the rotational sensor, the transmitter configured to send a signal having data acquired by the rotational sensor;
    a receiver connected to a processor on the helmet, the receiver configured to receive the wheel speed signal for processing by the processor;
    a first light connected to the processor, the first light responsive to the processed signal such that the light illuminates as result of a deceleration of the bicycle or motorcycle; and
    one or more accelerometers mounted to the helmet;
    the one or more accelerometers configured to generate a signal for processing by the processor;
    wherein the processor is configured to compare the accelerometer signal with the wheel speed signal.

34. A lighting system as recited in claim 33, further comprising:
    a console mounted on the motorcycle;
    wherein the console comprises a switch to power the system on and off.

35. A lighting system adapted to mount on a helmet of a person riding a motorcycle, the lighting system comprising:
    a rotational sensor adapted to be mounted on a fork and wheel of the motorcycle the rotational sensor configured to acquire wheel speed data;
    a transmitter connected to the rotational sensor, the transmitter configured to send a signal having data acquired by the rotational sensor;
    a receiver connected to a processor on the helmet, the receiver configured to receive the wheel speed for processing by the processor;
    a first light connected to the processor, the first light responsive to the processed signal such that the light illuminates as result of a deceleration of the motorcycle;
    a console mounted on the motorcycle;
    wherein the console comprises a switch to power the system on and off;
    a second light connected to the processor; the second light having a different color than the first light; and
    wherein the console further comprises a perimeter sensor, the perimeter sensor detecting when the person is inside a sensing a sensing area;
    wherein the second fight illuminates in response to the person being outside the sensing area.

36. A lighting system as recited in claim 34, wherein the console is configured to display the velocity of the motorcycle.

* * * * *